US012655996B2

(12) United States Patent
DeRossett et al.

(10) Patent No.: US 12,655,996 B2
(45) Date of Patent: Jun. 16, 2026

(54) DEHUMIDIFIER WITH PUMP PICK-UP

(71) Applicant: Midea Group Co., Ltd., Beijiao (CN)

(72) Inventors: Andrew DeRossett, Shelbyville, KY (US); Zachary Chapin, Louisville, KY (US)

(73) Assignee: MIDEA GROUP CO., LTD., Beijiao (CN)

( * ) Notice: Subject to any disclaimer, the term of this patent is extended or adjusted under 35 U.S.C. 154(b) by 879 days.

(21) Appl. No.: 17/934,926

(22) Filed: Sep. 23, 2022

(65) Prior Publication Data

US 2023/0018141 A1 Jan. 19, 2023

Related U.S. Application Data

(63) Continuation-in-part of application No. 16/875,847, filed on May 15, 2020, now Pat. No. 12,135,141, and a continuation-in-part of application No. 16/764,772, filed as application No. PCT/CN2020/086640 on Apr. 24, 2020, now Pat. No. 11,815,284, said (Continued)

(51) Int. Cl.

| | |
|---|---|
| ***F24F 1/022*** | (2019.01) |
| ***F24F 13/22*** | (2006.01) |
| ***F26B 21/08*** | (2006.01) |
| ***F26B 21/33*** | (2026.01) |
| *F24F 3/14* | (2006.01) |

(52) U.S. Cl.

CPC .............. *F24F 1/022* (2013.01); *F24F 13/22* (2013.01); *F26B 21/333* (2026.01); *F24F 2003/144* (2013.01)

(58) Field of Classification Search

CPC ......... F26B 21/086; F24F 13/22; F24F 1/022; F24F 3/1405; F24F 2003/144; F24F 3/14

See application file for complete search history.

(56) References Cited

U.S. PATENT DOCUMENTS

| | | | |
|---|---|---|---|
| 5,212,958 | A | 5/1993 | Anderson |
| 5,729,994 | A | 3/1998 | Mukaiyama |

(Continued)

FOREIGN PATENT DOCUMENTS

| | | | |
|---|---|---|---|
| CN | 1590879 | A | 3/2005 |
| CN | 2926888 | Y | 7/2007 |

(Continued)

OTHER PUBLICATIONS

Sanks, Schyler S., United States Patent and Trademark Office, Notice of Allowance issued in U.S. Appl. No. 17/708,873, 21 pages, dated Sep. 12, 2024.

(Continued)

*Primary Examiner* — Frantz F Jules
*Assistant Examiner* — Martha Tadesse
(74) *Attorney, Agent, or Firm* — Gray Ice Higdon

(57) ABSTRACT

A dehumidifier system is provided. The dehumidifier system may include a condensate tank and a dehumidifier. The dehumidifier may be positionable between at least one deployed position and at least one stowed position relative to the condensate tank. The condensate tank and the dehumidifier may telescope relative to each other. The dehumidifier system, or portions thereof, may include one or more stacking structures. The dehumidifier system, or portions thereof, may include a pump pick-up.

19 Claims, 16 Drawing Sheets

Related U.S. Application Data application No. 16/875,847 is a continuation of application No. PCT/CN2020/086640, filed on Apr. 24, 2020.

(56) References Cited

U.S. PATENT DOCUMENTS

| | | | | |
|---|---|---|---|---|
| 6,199,428 | B1 | 3/2001 | Estevez-Garcia et al. | |
| 6,210,566 | B1 | 4/2001 | King | |
| 6,370,902 | B1 | 4/2002 | De' Longhi | |
| 6,415,618 | B1 * | 7/2002 | Sul | F24F 3/153 62/291 |
| 7,490,706 | B2 | 2/2009 | Robertson | |
| 7,671,754 | B2 | 3/2010 | Heilmann et al. | |
| 7,821,411 | B1 | 10/2010 | Ward | |
| 8,172,154 | B1 | 5/2012 | Figley et al. | |
| 8,181,939 | B2 | 5/2012 | Yoon | |
| 8,196,422 | B2 | 6/2012 | Ritchey | |
| 8,292,117 | B2 | 10/2012 | Guibert | |
| 8,869,548 | B2 | 10/2014 | Piccione | |
| 8,994,812 | B2 | 3/2015 | Giordano et al. | |
| 9,074,812 | B2 | 7/2015 | Rowland | |
| 9,958,182 | B1 | 5/2018 | Rimmer | |
| 10,031,041 | B2 | 7/2018 | Franz et al. | |
| 10,458,730 | B2 | 10/2019 | Lorang et al. | |
| 10,473,355 | B2 | 11/2019 | O'Brien | |
| 10,578,481 | B2 | 3/2020 | Myeong et al. | |
| 10,677,479 | B2 | 6/2020 | Andersson | |
| 10,788,230 | B2 | 9/2020 | Williams | |
| 10,830,490 | B2 | 11/2020 | Rokade et al. | |
| 10,900,676 | B2 | 1/2021 | Swanson et al. | |
| 11,077,399 | B2 | 8/2021 | Choi et al. | |
| 2003/0066298 | A1 | 4/2003 | Yang | |
| 2004/0040322 | A1 | 3/2004 | Engel | |
| 2006/0258916 | A1 | 11/2006 | Pietersen | |
| 2014/0102296 | A1 | 4/2014 | Pendergrass | |
| 2014/0150488 | A1 | 6/2014 | Black et al. | |
| 2015/0184875 | A1 * | 7/2015 | Lee | F24F 3/1405 62/93 |
| 2015/0276241 | A1 | 10/2015 | Jeon et al. | |
| 2016/0153824 | A1 | 6/2016 | Myeong | |
| 2017/0185276 | A1 | 6/2017 | Lee et al. | |
| 2017/0336093 | A1 | 11/2017 | Huang et al. | |
| 2018/0172290 | A1 | 6/2018 | Zhou | |
| 2018/0372371 | A1 | 12/2018 | Demonte | |
| 2019/0055691 | A1 | 2/2019 | Tong | |
| 2019/0137121 | A1 * | 5/2019 | Swanson | F24F 1/028 |
| 2019/0137131 | A1 | 5/2019 | Sako et al. | |
| 2019/0232213 | A1 * | 8/2019 | Dios | F24F 13/20 |
| 2019/0323714 | A1 | 10/2019 | Cui | |
| 2020/0011556 | A1 | 1/2020 | Williams | |
| 2020/0061532 | A1 | 2/2020 | Yoon et al. | |
| 2020/0116392 | A1 | 4/2020 | Gardner et al. | |
| 2020/0182490 | A1 | 6/2020 | Li | |
| 2021/0332990 | A1 | 10/2021 | Yang et al. | |
| 2021/0333010 | A1 | 10/2021 | Yang et al. | |
| 2023/0194106 | A1 | 6/2023 | Leezer | |
| 2023/0314013 | A1 | 10/2023 | Derossett et al. | |

FOREIGN PATENT DOCUMENTS

| | | | | |
|---|---|---|---|---|
| CN | 201411571 | Y | 2/2010 | |
| CN | 202747574 | U | 2/2013 | |
| CN | 105387534 | A | 3/2016 | |
| CN | 106482317 | A | 3/2017 | |
| CN | 206338879 | U | 7/2017 | |
| CN | 107238146 | A * | 10/2017 | F24F 13/20 |
| CN | 207065748 | U | 3/2018 | |
| CN | 207094850 | U | 3/2018 | |
| CN | 108244846 | A | 7/2018 | |
| CN | 109425043 | A | 3/2019 | |
| CN | 110748988 | | 2/2020 | |
| CN | 111140989 | A | 5/2020 | |
| CN | 211476138 | U | 9/2020 | |
| CN | 110079982 | B2 | 4/2021 | |
| CN | 213713516 | U | 7/2021 | |
| EP | 2832920 | A1 | 2/2015 | |
| EP | 3872407 | A1 | 9/2021 | |
| JP | S62136213 | U | 8/1987 | |
| JP | H0665360 | B2 | 8/1994 | |
| JP | 2591726 | B2 | 3/1997 | |
| JP | 2009089995 | A | 4/2009 | |
| JP | 2013240406 | A | 12/2013 | |
| JP | 5887478 | B2 | 3/2016 | |
| JP | 3221820 | U | 6/2019 | |
| KR | 20150103909 | A | 9/2015 | |
| KR | 20160013477 | A | 2/2016 | |
| KR | 20160054723 | A | 5/2016 | |
| WO | 9314353 | A1 | 7/1993 | |
| WO | 2006013653 | A1 | 2/2006 | |
| WO | WO-2020003664 | A1 * | 1/2020 | F24F 1/022 |

OTHER PUBLICATIONS

Nouketcha, Lionel W., United States Patent and Trademark Office, Notice of Allowance issued in U.S. Appl. No. 17/559,404, 24 pages, dated Sep. 18, 2024.

United States Patent and Trademark Office; Final Rejection Issued in U.S. Appl. No. 16/764,772; 42 pages; dated Dec. 16, 2022.

Nouketcha, Lionel W., United States Patent and Trademark Office, Non-Final Office Action issued in U.S. Appl. No. 17/559,404, 74 pages , dated Apr. 3, 2024.

Sullens, Tavia L., United States Patent and Trademark Office, Notice of Allowance issued in Application No. U.S. Appl. No. 16/875,847, 30 pages, dated Feb. 21, 2024.

Sullens, Tavia L., United States Patent and Trademark Office, Non-Final Office Action issued in U.S. Appl. No. 16/875,847, 43 pages, dated Sep. 8, 2023.

Tadesse, Martha, United States Patent and Trademark Office, Notice of Allowance issued in U.S. Appl. No. 16/764,772, 23 pages, dated Jul. 6, 2023.

Sullens, Tavia L., United States Patent and Trademark Office, Final Office Action issued in U.S. Appl. No. 16/875,847, 35 pages, dated Apr. 20, 2023.

Sanks, Schyler S., United States Patent and Trademark Office, Non-Final Office Action issued in U.S. Appl. No. 17/708,873, 83 pages, dated May 22, 2024.

Sheth, Sarang, The Foldable Dehumidifier Has a Bellow-Shaped Water Tank That Expands as it Fills Up, Yanko Design, GREE Electric Appliances Inc., www.yankdesign.com/author/sarangsheth, Oct. 24, 2019.

International Search Report and Written Opinion issued in Application No. PCT/CN2020/086640 dated Jan. 13, 2021.

U.S. Patent and Trademark Office, Office Action issued in U.S. Appl. No. 16/764,772 dated Sep. 21, 2021.

Putri, Dewi et al., Design and Performance Analysis of Smart Roof Clothesline System Based on Microcontroller by Smartphone Application, School of Electrical Engineering, Telkom University, Dec. 20, 2018.

Belin, Belin Brand BL-890D 90L (150) Pint R410a without water tank drainage directly commercial industrial dehumidifier, alibaba.com, Retrieved from: https://www.alibaba.com/product-detail/BELIN-brand-BL-890D-90L-150Pint_60447146179.html?spm=a2700.7724857.normal_offer.d_title.79fb5cd7iHcdoL, Retrieved on Mar. 23, 2021.

Innovative Dehumidifier Systems, Tankless Dehumidification System Independent of HVAC, IW25-4 In Wall/ On Wall Dehumidifier, Retrieved from: https://www.innovativedehumidifiers.com/dehumidification-system/, Retrieved on Mar. 23, 2021.

Related Applications Transmittal dated Sep. 23, 2022.

U.S. Patent and Trademark Office, Office Action issued in U.S. Appl. No. 16/764,772 dated May 26, 2022.

Sullens, Tavia L, United States Patent and Trademark Office, Office Action issued in U.S. Appl. No. 16/875,847, 31 pages, dated Sep. 1, 2022.

* cited by examiner

DEHUMIDIFIER WITH PUMP PICK-UP

BACKGROUND

The present embodiments relate to a dehumidifier integrated with a pump pick-up.

Typical dehumidifier systems include a water suction hose attached to a pump inlet and loosely hung within the tank to draw water out of the system. This may lead to problems including, but not limited to, increasing assembly time and/or cost, pinched hoses, difficult troubleshooting, and/or loose hose connections. Thus, there is a need for a dehumidifier system for pump pick-up and/or ease of assembly, etc.

SUMMARY

In some embodiments of the invention, for example, a dehumidifier system may include a dehumidifier, a condensate tank, a stacking structure. In various embodiments, the dehumidifier may have at least a condenser and an evaporator. In some embodiments, the condensate tank may have a housing having an opening into a volume therein, wherein a first portion of the volume of the condensate tank may be occupied by the dehumidifier in a stowed position, and a second portion of the volume may be unoccupied when the dehumidifier is in a deployed position. In various embodiments, the stacking structure may engage the dehumidifier to the condensate tank when in the deployed position.

In some embodiments, the stacking structure may be disengaged in the stowed position and engaged in the deployed position. In various embodiments, the stacking structure may be one or more protrusions inwardly projecting into the volume adjacent the opening of the condensate tank to position the dehumidifier in the deployed position. In some embodiments, the one or more protrusions may project into the volume when the dehumidifier is in the deployed position and are stowed in a different position when the dehumidifier is in the stowed position. Moreover, in various embodiments, the dehumidifier may include a housing having at least the condenser, the evaporator, a compressor, and a fan therein. In some embodiments, the dehumidifier may be in a first orientation relative to the condensate tank when in the stowed position and a second orientation relative to the condensate tank when in the deployed position, wherein the first orientation and the second orientation is different. In various embodiments, the condensate tank may include an upper rim defining the opening and an opposing bottom wall, wherein the stacking structure may be positioned adjacent the upper rim.

In various embodiments, a dehumidifier system may comprise a dehumidifier, a condensate tank, and one or more stacking structures. In some embodiments, the dehumidifier may have a housing. In various embodiments, the condensate tank may have a housing having an opening therein. In some embodiments, the one or more stacking structures may engage the housing of the dehumidifier to the housing of the condensate tank.

In addition, in some embodiments, when in a deployed position the one or more stacking structures may engage the housing of the dehumidifier to the housing of the condensate tank. In various embodiments, the dehumidifier system may have an overall height increasing in size from a stowed position to the deployed position. In some embodiments, a portion of a volume within the housing of the condensate tank that can collect condensate increases in size from a stowed position to the deployed position. In various embodiments, the one or more stacking structures may be positioned between a stowed position and a deployed position, wherein when the one or more stacking structures is in the deployed position the one or more stacking structures engages the housing of the dehumidifier to the housing of the condensate tank. In some embodiments, the one or more stacking structures may include one or more protrusions adjacent the opening. In addition, in various embodiments, the one or more stacking structures may be fixed in position. In some embodiments, the one or more stacking structures may stop axial movement in at least one direction between the housing of the dehumidifier to the housing of the condensate tank.

In some embodiments, a method of operating a dehumidifier system may include the step of providing a dehumidifier having a housing. In various embodiments, the method may include providing a condensate tank having a housing. In some embodiments, the method may include deploying the housing of the dehumidifier from the housing of the condensate tank. Moreover, in various embodiments, the method may include engaging one or more stacking structures when the housing of the dehumidifier is deployed from the housing of the condensate tank.

In addition, in some embodiments, the method may include disengaging the one or more stacking structures between the housing of the dehumidifier and the housing of the condensate tank. In various embodiments, the method of engaging one or more stacking structures may include the step of deploying one or more stacking structures from a stowed position. In some embodiments, the method may include stowing the one or more stacking structures. In various embodiments, the method may include stowing the housing of the dehumidifier into the housing of the condensate tank.

In some embodiments of the invention, for example, a dehumidifier system may include a dehumidifier and/or a condensate tank. In various embodiments, the dehumidifier may have a housing. In some embodiments, the condensate tank may have a housing defining a volume therein. In various embodiments, the housing of the dehumidifier may be in telescoping engagement into and out of the volume of the housing of the condensate tank.

In some embodiments, the telescoping engagement may telescope the dehumidifier within the volume of the housing of the condensate tank from a stowed position towards a deployed position. In various embodiments, a portion of the volume within the housing of the condensate tank occupied by the dehumidifier may decrease in size from the stowed position to the deployed position of the dehumidifier. Moreover, in some embodiments, the dehumidifier system may further include a stacking structure between the dehumidifier and the condensate tank when in the deployed position. In various embodiments, the stacking structure may stop the telescoping engagement between the condensate tank and the dehumidifier. In some embodiments, the dehumidifier may be in a first orientation about a longitudinal axis relative to the condensate tank in the stowed position and a second orientation about the longitudinal axis relative to the condensate tank in the deployed position. In various embodiments, the first orientation may be different than or the same as the second orientation. In some embodiments, the telescoping engagement includes an outer periphery of the dehumidifier housing sliding along an inner periphery of the condensate tank housing.

In various embodiments, a dehumidifier system comprising a dehumidifier and/or a condensate tank. In some embodiments, the dehumidifier may have a housing. In various embodiments, the condensate tank may have a housing defining a volume therein. Moreover, in various embodiments, the housing of the dehumidifier may be positionable between a stowed position within a portion of the volume of the housing of the condensate tank and a deployed position different from the stowed position.

In addition, in some embodiments, the dehumidifier may be in a first orientation about a longitudinal axis relative to the condensate tank in the stowed position and a second orientation about the longitudinal axis relative to the condensate tank in the deployed position. In various embodiments, the first orientation may be different than the second orientation. In some embodiments, the first orientation may be the same as the second orientation. In various embodiments, the dehumidifier system may include a telescoping engagement between the housing of the dehumidifier and the housing of the condensate tank. Moreover, in some embodiments, the telescoping engagement may be a sliding engagement therebetween. In various embodiments, the portion of the volume within the housing of the condensate tank occupied by the dehumidifier may decrease in size from the stowed position to the deployed position of the dehumidifier.

In some embodiments, a method of operating a dehumidifier system may include the step of providing a dehumidifier having a housing. In various embodiments, the method may include providing a condensate tank having a housing. In some embodiments, the method may include telescoping the housing of the dehumidifier relative to the housing of the condensate tank.

In addition, in some embodiments, the method may include engaging a stacking structure between the housing of the dehumidifier and the housing of the condensate tank. In various embodiments, the method may include disengaging the stacking structure between the housing of the dehumidifier and the housing of the condensate tank. In some embodiments, the method may include disengaging a stacking structure between the housing of the dehumidifier and the housing of the condensate tank. In various embodiments, the method of telescoping may include at least one of pivoting and/or axially relative movement about an axis A between the housing of the dehumidifier and the housing of the condensate tank. Moreover, in some embodiments, the method of telescoping may include positioning the dehumidifier between a stowed position with the housing of the condensate tank and a deployed position with the housing of the condensate tank. In various embodiments, the method of telescoping unoccupies a portion of a volume of the housing of the condensate tank.

In some embodiments, a dehumidifier system may include a dehumidifier having a housing, a pump, and/or a docking member. In various embodiments, the system may include a condensate tank having a housing defining a volume therein and a docking pipe. In some embodiments, the system may include a telescoping engagement of the housing of the dehumidifier along a vertical axis with the housing of the condensate tank. In various embodiments, the telescoping engagement along the vertical axis sealingly engages the docking member of the dehumidifier with the docking pipe of the condensate tank.

In addition, in some embodiments, the telescoping engagement may disengage the docking member of the dehumidifier with the docking pipe when separating the dehumidifier housing from the condensate tank housing along the vertical axis. In various embodiments, the system may include a stacking structure between the dehumidifier and the condensate tank when in a deployed position, wherein the stacking structure stops the telescoping engagement between the condensate tank and the dehumidifier, and/or wherein the docking pipe is positioned adjacent the stacking structure about an inner periphery of the condensate tank housing. In some embodiments, the docking pipe may include an outlet end projecting upwardly from the stacking structure. In various embodiments, the stacking structure may include a lock mechanism to prevent stowing of the dehumidifier housing within the condensate tank housing, wherein the docking pipe extends through the lock mechanism. In various embodiments, the docking pipe may include an outlet end and an opposing inlet end, wherein the outlet end of the docking pipe may be adjacent a top wall defining an opening of the condensate tank housing and the inlet end may be adjacent a bottom wall of the condensate tank, and/or wherein the outlet end defines an opening facing upwardly along the vertical axis. In some embodiments, the docking member may include an inlet end upstream of the pump of the dehumidifier housing, wherein the inlet end may be adjacent a bottom wall of the dehumidifier housing and defines an inlet opening facing downwardly along the vertical axis. In various embodiments, the condensate tank may include at least one screen adjacent an inlet end of the docking pipe. In some embodiments, the docking pipe may be misaligned with the docking member when the dehumidifier housing is a first orientation about the vertical axis when in a stowed position relative to the condensate tank housing and the docking pipe is aligned with the docking member when the dehumidifier housing is in a second orientation, different from the first orientation, about the vertical axis when in a deployed position relative to the condensate tank housing.

In some embodiments, a dehumidifier system may include a dehumidifier having a housing, wherein the housing may include a top wall and an opposing bottom wall, and wherein the bottom wall may include a docking member. In various embodiments, the system may include a condensate tank having a housing defining a volume therein, wherein the housing may include a top wall defining an opening and an opposing bottom wall, and a docking pipe may have an inlet end adjacent the bottom wall and an outlet end adjacent the top wall. In some embodiments, the housing of the dehumidifier may be in a telescoping engagement within the volume of the housing of the condensate tank between a stowed position and a deployed position, wherein when in the stowed position the bottom wall and the docking member of the dehumidifier housing may be adjacent the bottom wall of the condensate tank housing and when in the deployed position the bottom wall and the docking member of the dehumidifier housing may be adjacent the top wall of the condensate tank housing thereby positioning the docking member in an axial engagement with the outlet end of the docking pipe along a vertical axis.

In addition, in some embodiments, the docking member of the dehumidifier may be in a first orientation about the vertical axis relative to the condensate tank in the stowed position and a second orientation, different than the first orientation, about the vertical axis relative to the condensate tank in the deployed position. In various embodiments, the axial engagement between the docking member and the docking pipe may occur in a single pivot position about the vertical axis in the deployed position. In various embodiments, the system may include a stacking structure between the dehumidifier and the condensate tank when in the deployed position, wherein the stacking structure may stop the telescoping engagement between the condensate tank and the dehumidifier, and wherein the docking pipe may be positioned adjacent the stacking structure about an inner periphery of the condensate tank housing. In some embodiments, the docking pipe may include an outlet end projecting upwardly from the stacking structure. In various embodiments, the stacking structure may include a lock mechanism to prevent stowing of the dehumidifier housing within the condensate tank housing, wherein the docking pipe may extend through the lock mechanism.

In some embodiments, a method of operating a dehumidifier system may include the step of providing a dehumidifier having a housing, a pump, and/or a docking member upstream of the pump. In various embodiments, the method may include providing a condensate tank having a housing and a docking pipe. In some embodiments, the method may include telescoping the housing of the dehumidifier relative to the housing of the condensate tank along a vertical axis to releasably and axially engage the docking member to the docking pipe.

In addition, in some embodiments, the method may include pivoting the dehumidifier housing relative to the condensate tank housing about the vertical axis between a first pivot position and a second pivot position different from the first pivot position, wherein the docking member may be axially aligned with the docking pipe in the first pivot position about the vertical axis and may be axially misaligned with the docking pipe in the second pivot position. In various embodiments, the method may include stacking the dehumidifier housing relative to the condensate tank housing with one or more stacking structures when releasably and axially engaging the docking member to the docking pipe. In some embodiments, the method may include pumping fluid from the condensate tank housing through the docking pipe extending through one or more stacking structures. In various embodiments, the method may include telescoping the housing of the dehumidifier relative to the housing of the condensate tank along the vertical axis to releasably and axially disengage the docking member from the docking pipe. In some embodiments, the method may include sealing the docking member to the docking pipe when telescoping the housing of the dehumidifier relative to the housing of the condensate tank along the vertical axis.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques and apparatuses within a dehumidifier system, such as the type that may be used in single-family or multi-family dwellings, or in other similar applications. However, it will be appreciated that the herein-described techniques may also be used in connection with other types of dehumidifying machines in some embodiments. For example, the herein-described techniques may be used in commercial applications in some embodiments.

Figure 1:
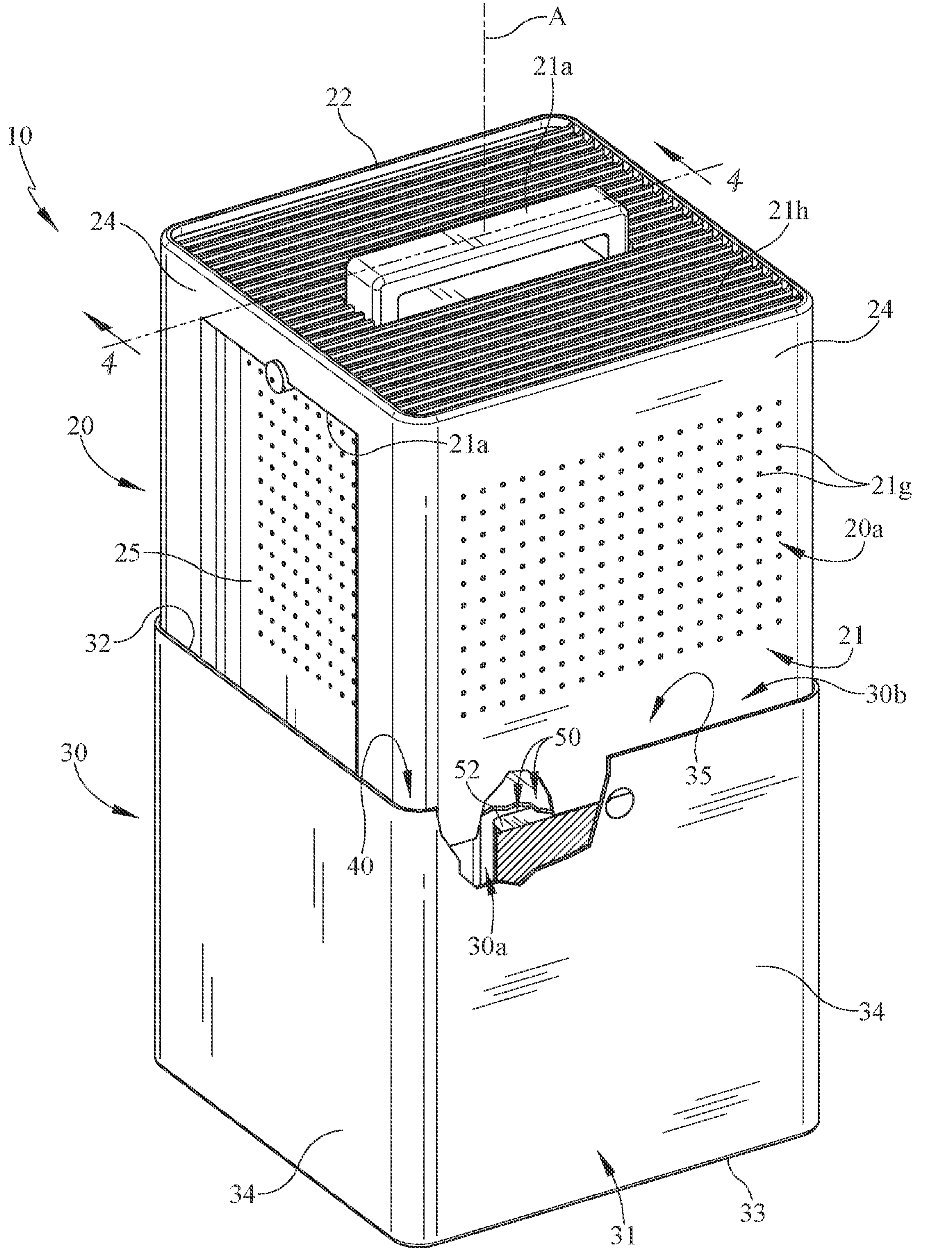
FIG. 1 is a perspective view of an embodiment of a dehumidifier system in deployed and/or operating position, illustrating an embodiment of a dehumidifier stacked with an embodiment of a condensate tank.
Figure 2:
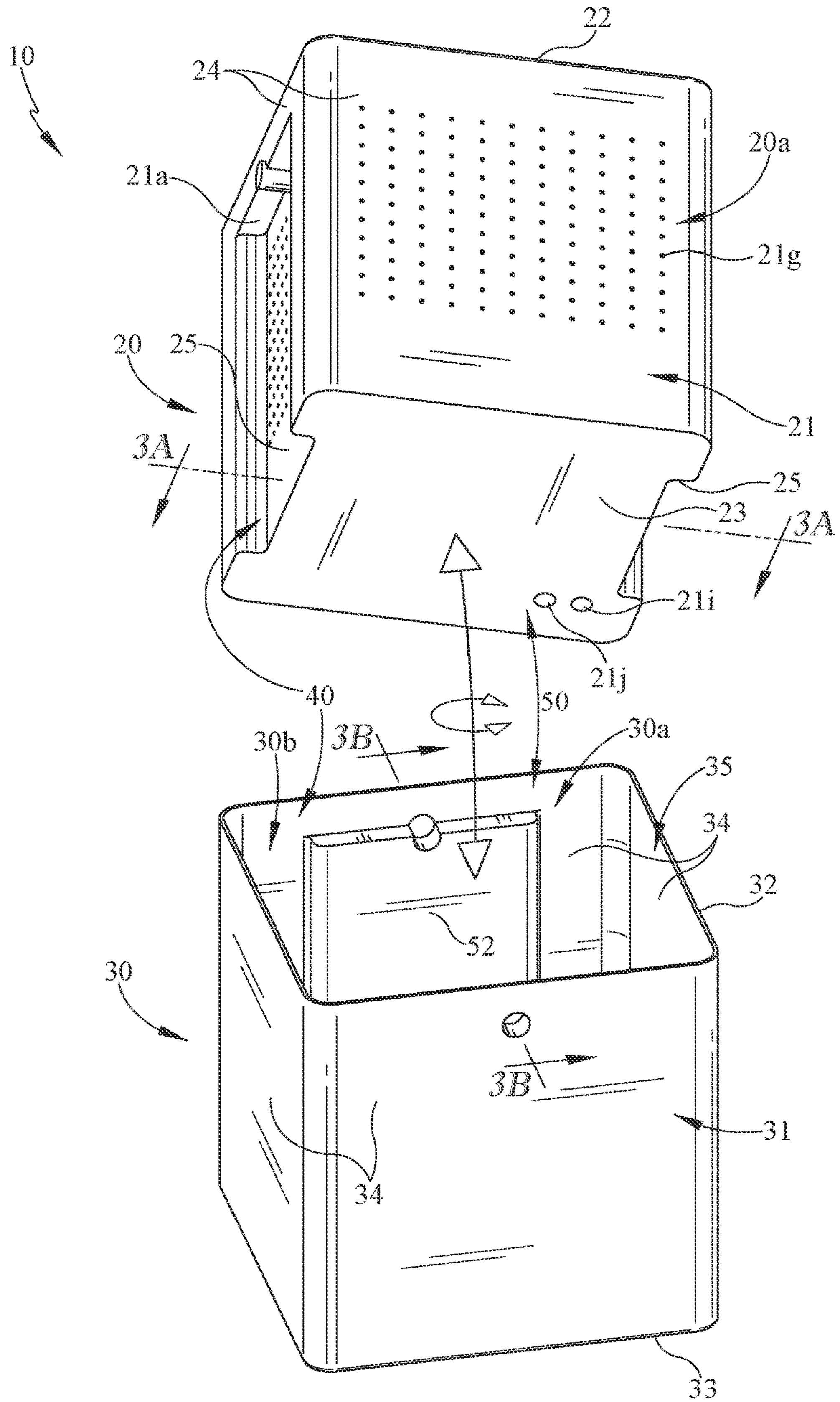
FIG. 2 is an exploded view of the dehumidifier system of FIG. 1 with the dehumidifier exploded away from the condensate tank.
Figure 3:
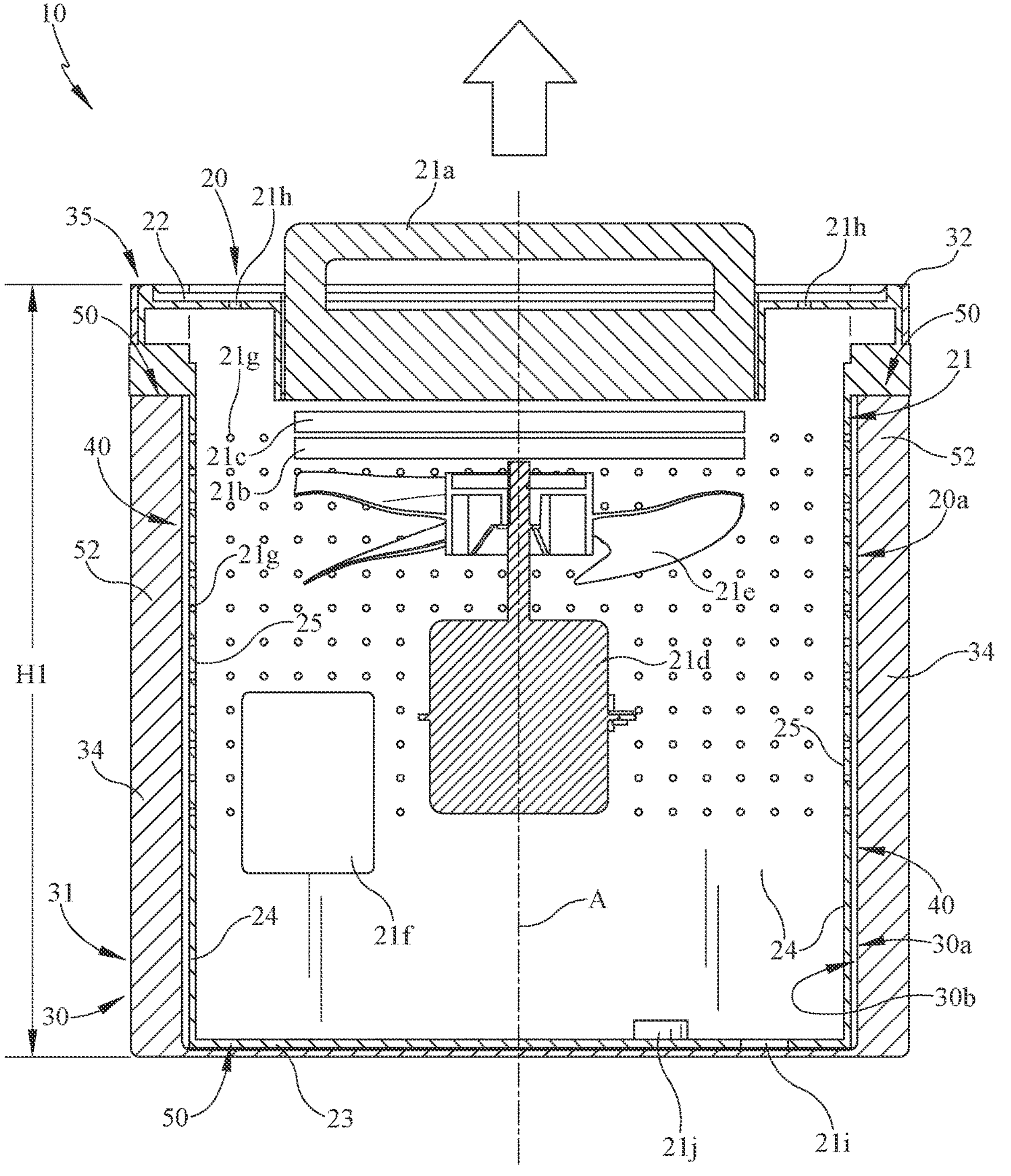
FIG. 3 is sectional view of dehumidifier system in a stowed position taken along line 3A-3A of the dehumidifier of FIG. 2 and line 3B-3B of the condensate tank of FIG. 2, illustrating a nesting relationship and/or a first orientation between the dehumidifier and the condensate tank and one or more stacking structures misaligned/disengaged.
Figure 4:
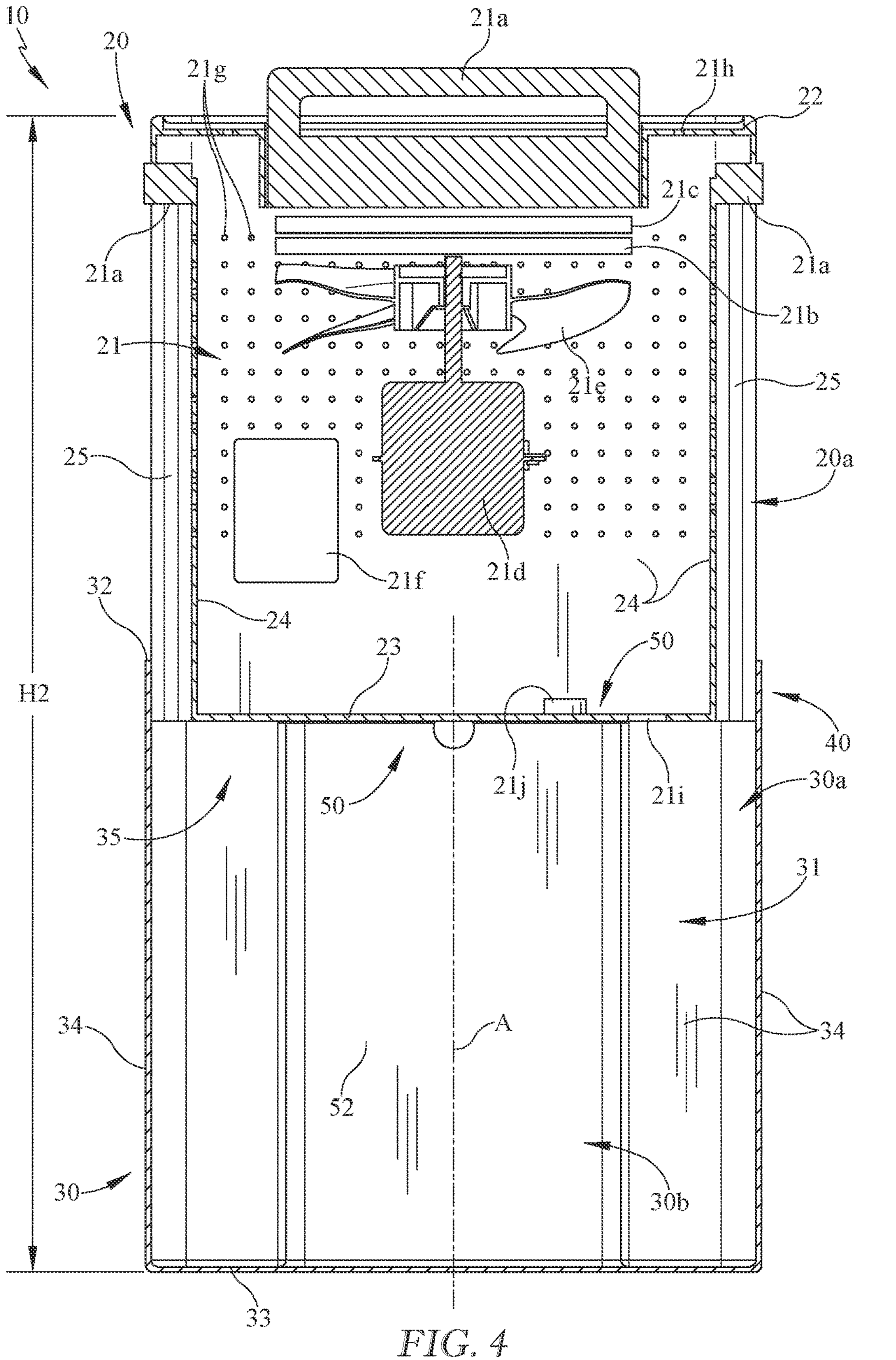
FIG. 4 is a sectional view of dehumidifier system in the deployed position taken along line 4-4 of FIG. 1 illustrating the stacking relationship and/or a second orientation between the dehumidifier and the condensate tank and/or one or more stacking structures aligned/engaged.
Figure 5:
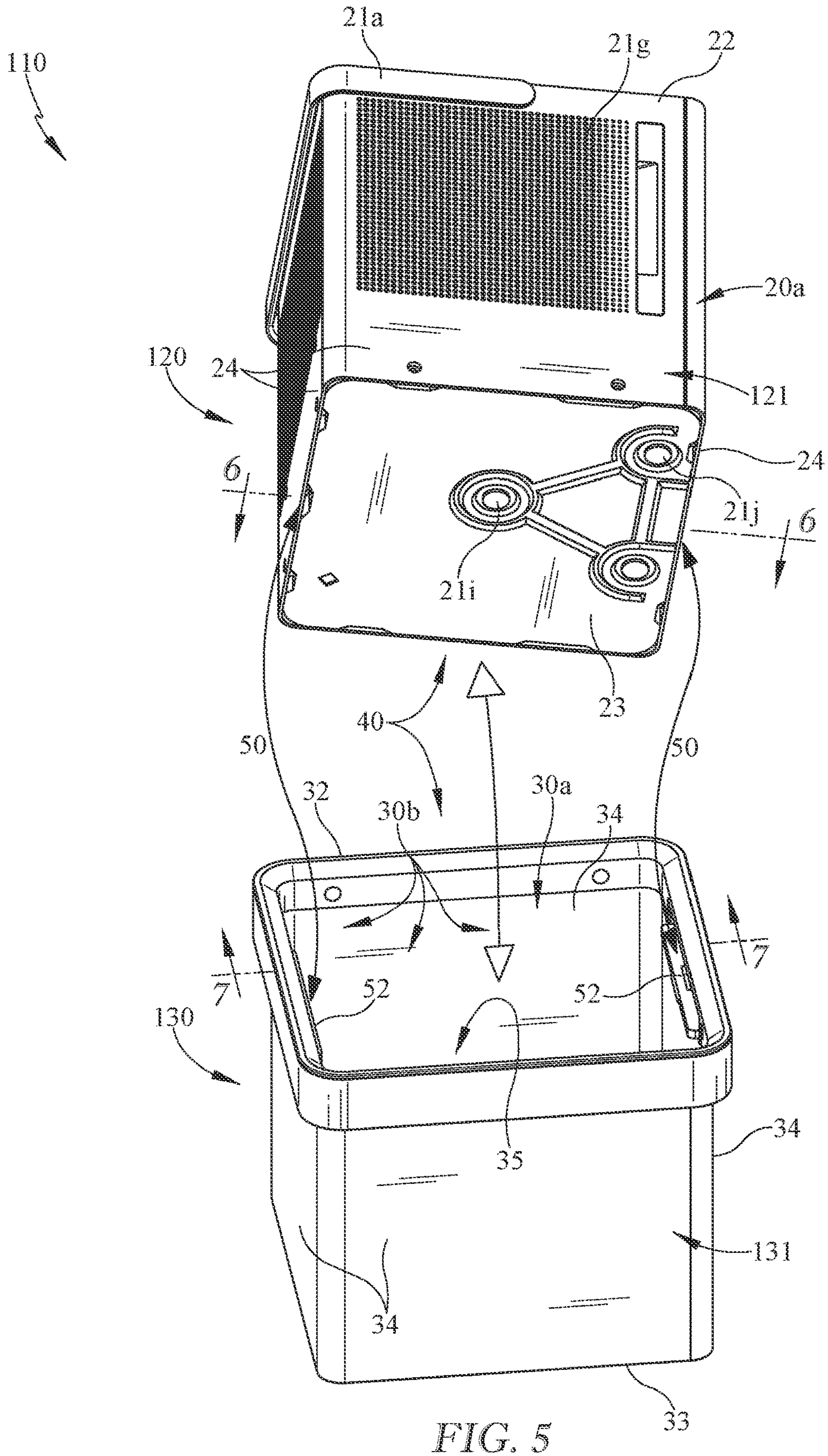
FIG. 5 is an exploded view of another dehumidifier system with the dehumidifier exploded away from the condensate tank, and illustrating one or more stacking structures in a deployed position.
Figure 6:
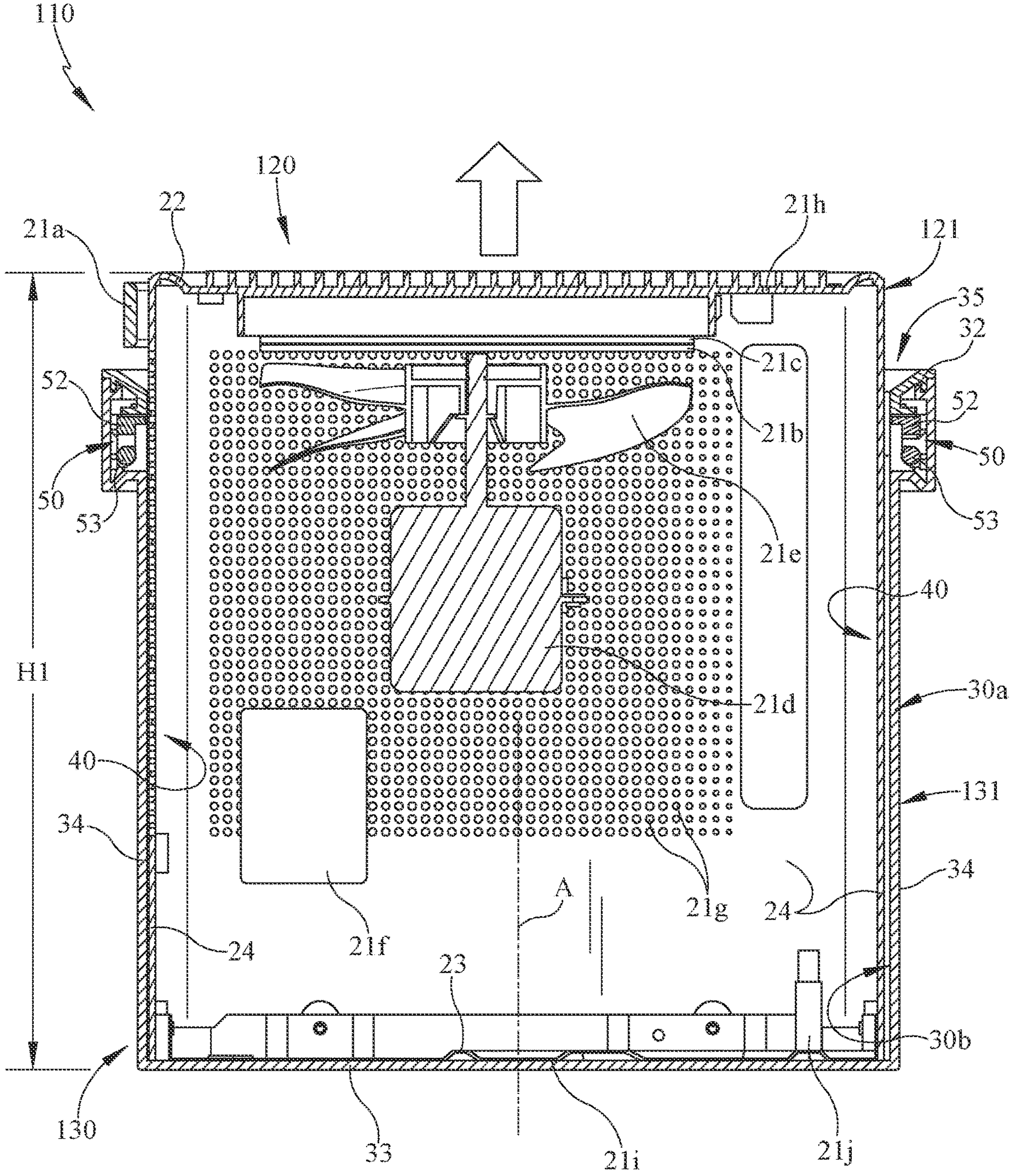
FIG. 6 is sectional view of dehumidifier system in a stowed position taken along line 6-6 of the dehumidifier of FIG. 5 and line 7-7 of the condensate tank of FIG. 5, illustrating a nesting relationship between the dehumidifier and the condensate tank and the one or more stacking structures in a stowed position.
Figure 7:
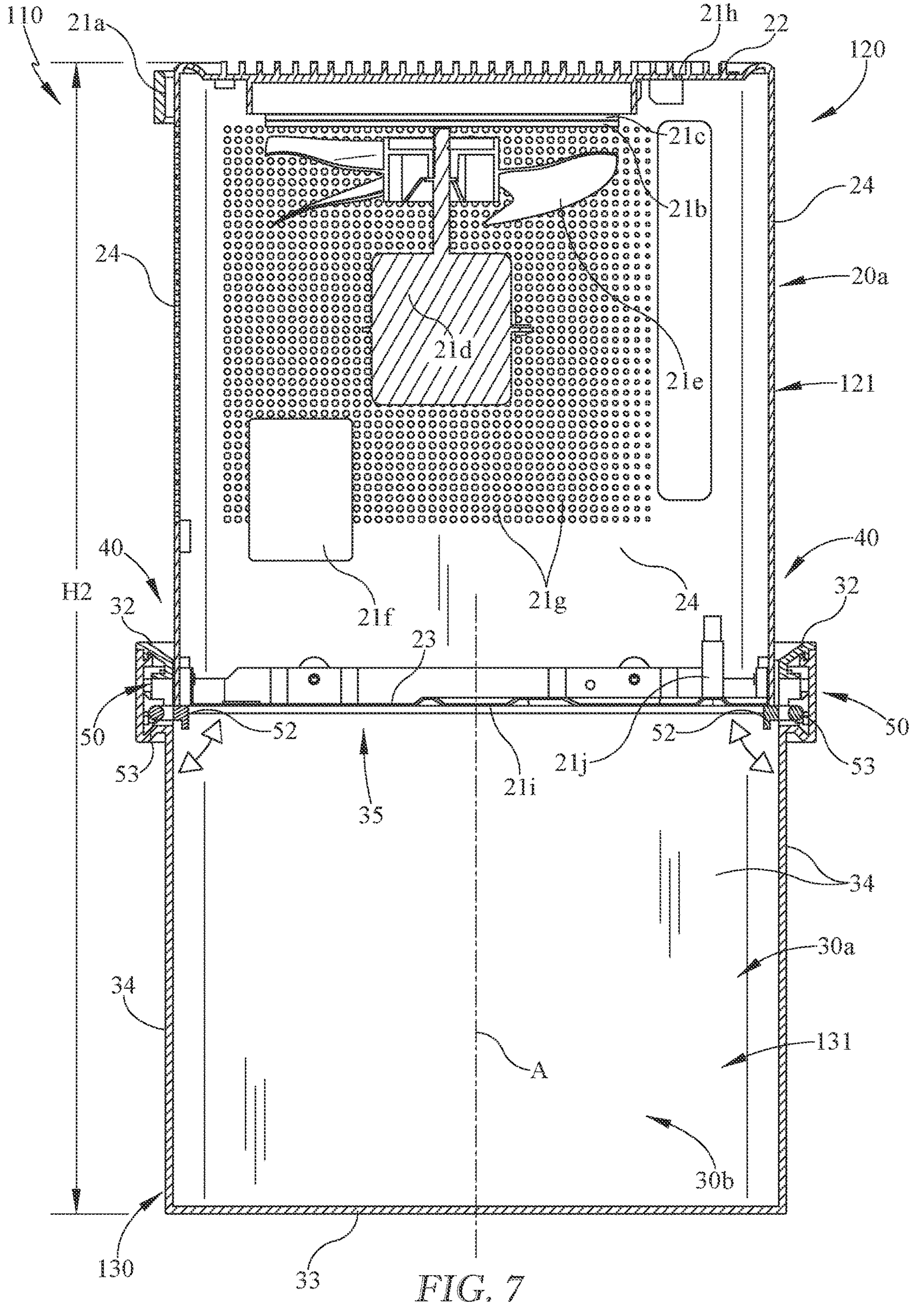
FIG. 7 is a sectional view of dehumidifier system in the deployed position taken along line 6-6 of the dehumidifier of FIG. 5 and line 7-7 of the condensate tank of FIG. 5, illustrating the stacking relationship between the dehumidifier and the condensate tank and the stacking structure in the deployed and/or engaged position.
Figure 8:
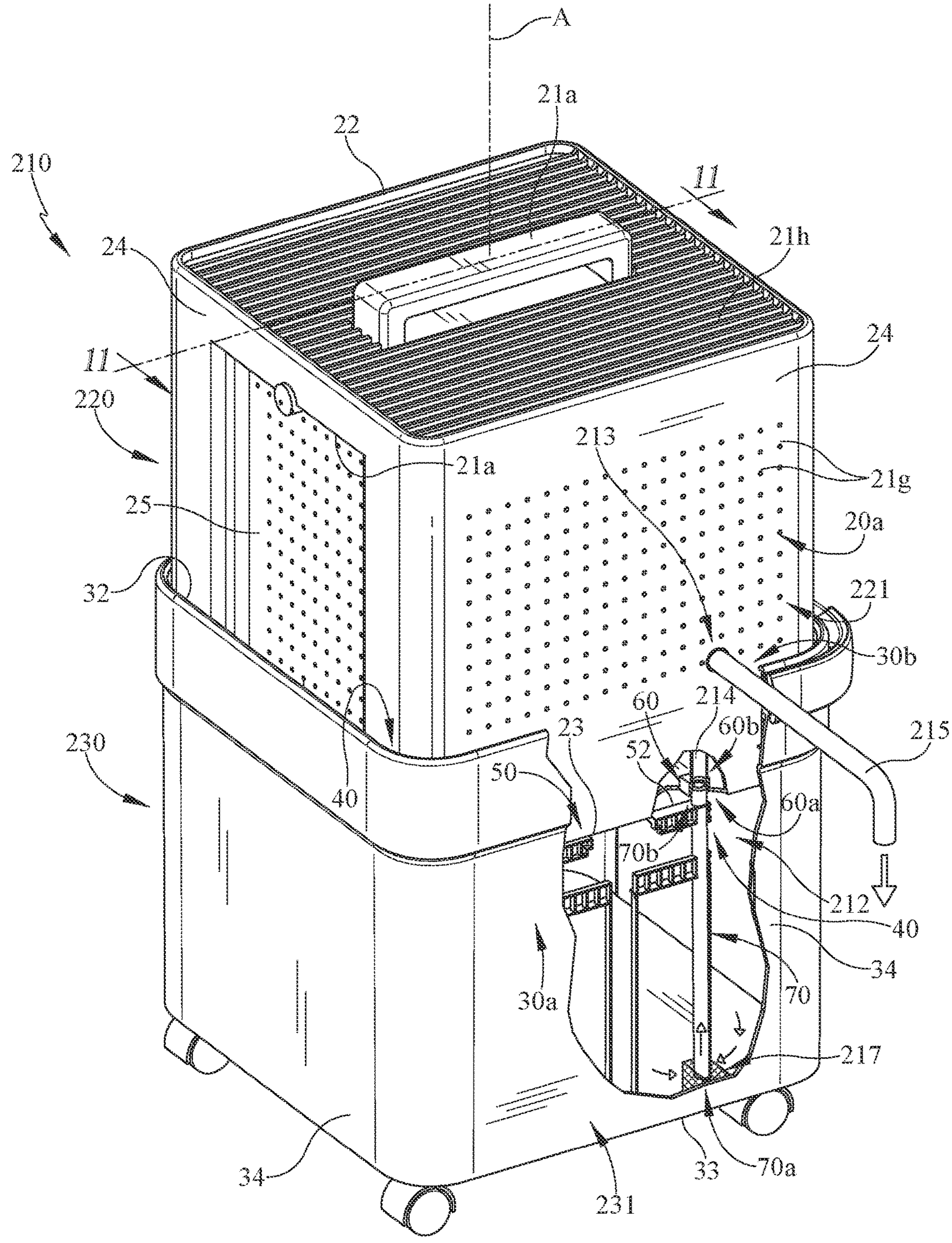
FIG. 8 is a perspective view of another embodiment of a dehumidifier system in a deployed and/or operating position, illustrating a pump pick-up with an embodiment of a dehumidifier stacked with an embodiment of a condensate tank.
Figure 9:
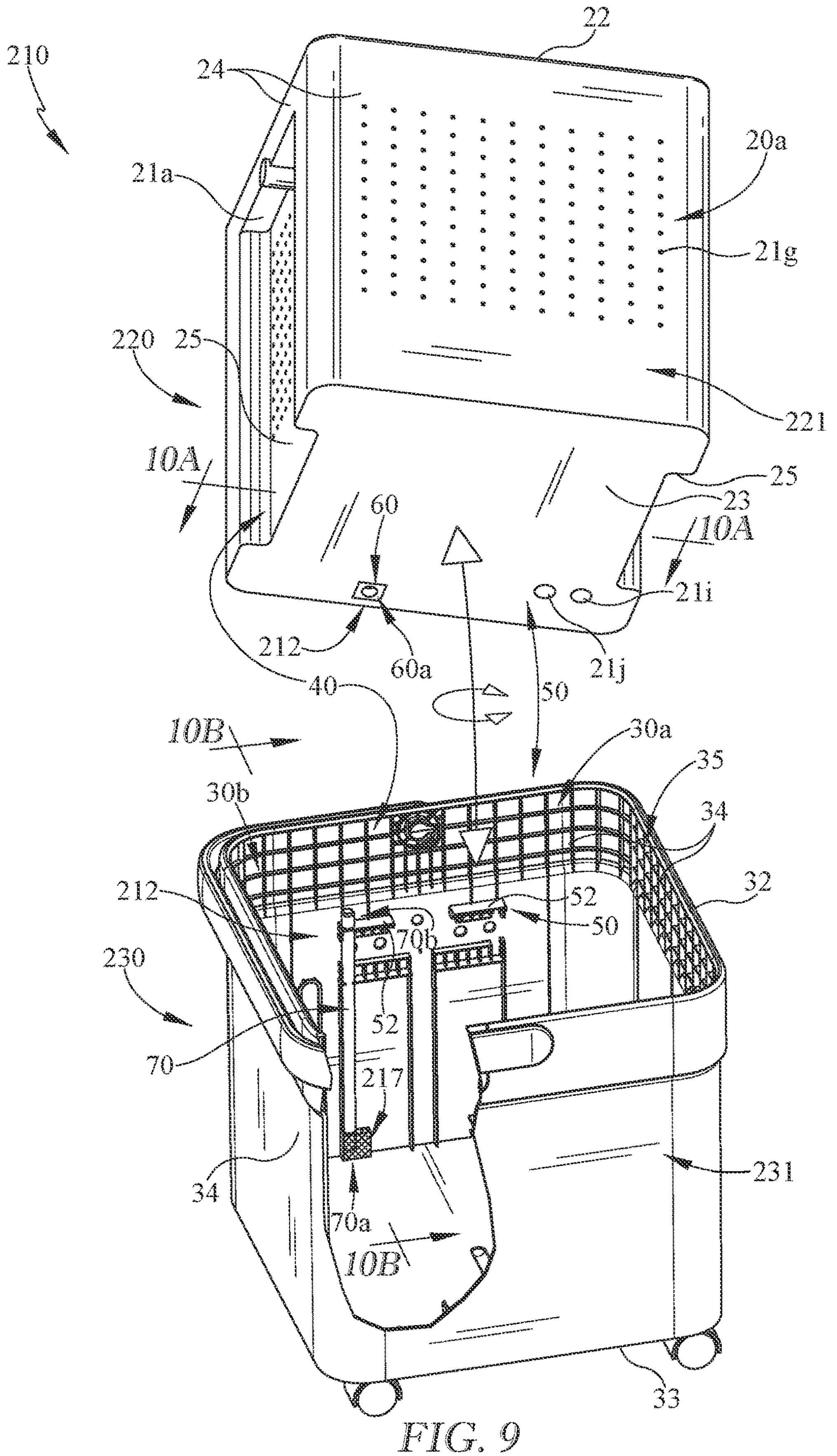
FIG. 9 is an exploded view of the dehumidifier system of FIG. 8 with the dehumidifier exploded away from the condensate tank.

Turning now to the drawings, wherein like numbers denote like parts throughout the several views, FIGS. 1-7 illustrate an example dehumidifier system 10, 110 in which the various technologies and techniques described herein may be implemented. The dehumidifier system 10, 110 may efficiently utilize a given space and provides for convenient storage, shipping, handling, operating, etc. The dehumidifier system 10, 110 includes a condensing unit or dehumidifier 20, 120 (e.g. body or housing 21, 121, etc.), or portions thereof, in a nesting engagement/relationship with a reservoir or condensate tank 30, 130 (e.g. body or housing 31, 131, etc.), or portions thereof. In the stowed position as shown in FIGS. 3 and 6, the dehumidifier 20, 120 may be at least partially nested within a volume 30*a* or inner periphery 30*b* (e.g. one or more inner surfaces, top, bottom, side walls) of the condensate tank 30, 130. When nested or stowed (FIG. 3) the overall volume/shape/size (e.g. height) is minimized as compared to the deployed position (FIG. 4) out of the nested or stowed position. The dehumidifier system 10, 110 includes a telescoping engagement 40 of the dehumidifier 20, 120 (e.g. body or housing 21, 121, side walls, etc.) with the condensate tank (e.g. body or housing, side walls, etc.). The dehumidifier 20, 120, or portions thereof, may telescope (e.g. vertical) into and/or out of the volume 30*a* or portions defined by the condensate tank 30, 130, or portions thereof (e.g. housing). The dehumidifier 20, 120 may be positionable (e.g. telescoped) between a stowed position (FIGS. 3 and 6) with the condensate tank 30, 130 and a deployed position (FIGS. 4 and 7). In the stowed position as shown in FIGS. 3 and 6, the one or more outer extent dimension (e.g. the overall height and/or other dimensions) of the system 10, 110 may be reduced and at least a first portion of the condensate tank 30, 130 (e.g. volume, housing, or interior) may be occupied by at least a portion of the dehumidifier 20, 120. In the deployed position as shown in FIGS. 4 and 7, the dehumidifier 20, 120 may stack upon or engage the tank and occupy a second portion of the condensate tank 30, 130 (e.g. volume, housing, or interior). In some embodiments as shown, the second portion may be smaller (e.g. zero) than the first portion. The condensate may be collected in the useable volume or portion of the volume 30*a* of the tank 30, 130 not occupied by the second portion of the tank or tank housing when in the deployed or operating position. Alternatively stated, the portion of the volume 30*a* within the housing 31, 131 of the condensate tank 30, 130 occupied by the dehumidifier 20, 120 may decrease in size from the stowed position to the deployed position. Further, the overall height of the dehumidifier system may be reduced from the deployed position to the stowed position. Moreover, in at least one of the stowed and/or deployed positions the dehumidifier system may operate. For example, in one embodiment, the dehumidifier system may operate in the deployed position and not in the stowed position. In other embodiments, the dehumidifier system may operate in both the stowed and the deployed positions. The dehumidifier system, or portions thereof, may be a variety of shapes, sizes, quantities, and constructions and still be within the scope of the invention.

In some implementations, the telescoping engagement 40 may be between one or more portions of the dehumidifier 20, 120 and one or more portions of the condensate tank 30, 130. The telescoping engagement 40 may be for a variety of distances between the dehumidifier and the condensate tank, or portions thereof. The telescoping engagement 40 may be a sliding engagement between one or more surfaces (e.g. side walls of each housing). The telescoping engagement 40 may be in a variety of directions, orientations, distances, constructions, etc. relative to the portions of the dehumidifier system. The telescoping engagement, if used, may slide between one or more positions between or including the stowed and deployed positions. In the embodiment shown, the dehumidifier 20, 120 telescopes at least upwardly/downwardly (e.g. vertical direction) relative to the condensate tank 30, 130, or portions thereof. The dehumidifier 20, 120 may be positioned or telescoped to one or more positions (e.g. deployed, stacked, mounted, rested, supported, above) with the condensate tank 30, 130 or out of a portion of the volume 30*a* of the condensate tank 30, 130. The dehumidifier 20, 120 may include the housing 21, 121 having an outer periphery 20*a* (e.g. square, cylindrical, etc.) in sliding/telescoping engagement 40 with the inner periphery 30*b* (e.g. defining the volume, square, cylindrical, etc.) of the housing 31, 131 of the condensate tank 30, 130. The telescoping engagement 40 may increase the overall height of the dehumidifier system 10, 110 when in the deployed position and may decrease the overall height of the dehumidifier system 10, 110 when in the stowed position. The one or more telescoping engagements 40 may be a variety of sizes, shapes, quantities, constructions, distances, directions, movements, and positions between the portions of the dehumidifier system (e.g. dehumidifier and/or condensate tank) and still be within the scope of the invention. For example, the telescoping engagement may be along one more axis A and/or directions (e.g. in a vertical direction or longitudinal axis). Moreover, in some embodiments, the telescoping engagement may be in at least a vertical direction or relative movement along axis A between one or more positions. In various embodiments, the telescoping engagement may include one or more rotational and/or pivoting directions or relative movement between one or more positions In addition, for example, the telescoping engagement may include both pivoting and axial relative movement between the housings (e.g. pivoting about an axis between one or more positions before, during, and/or after sliding along the axis). The overall height of the dehumidifier system may increase from a first height H1 when in the stowed position or first telescoping position to a second height H2 when in the deployed position or second telescoping position. The height the dehumidifier 20, 120 when deployed may be a higher elevation than the height of the dehumidifier 20, 120 when stowed.

In some implementations, the dehumidifier 20, 120 may be a variety of shapes, sizes, quantities, and constructions and still be within the scope of the invention. For example, in the one embodiment shown, the housing 21, 121 of the dehumidifier may include a top wall 22 and/or an opposing bottom wall 23 interconnected by one or more side walls 24. The one or more side walls 24 may define one or more portions of the outer periphery 20*a*, wherein the outer periphery 20*a* may be in telescoping engagement 40 with the tank 30, 130, or portions thereof (e.g. the housing of tank). In some implementations, the system, dehumidifier, or housing may include one or more of a handle 21*a*, a condenser 21*b*, an evaporator 21*c*, a motor 21*d*, a fan 21*e*, a compressor 21*f*, an air inlet 21*g*, an air outlet 21*h*, drain 21*i*, and/or level sensor 21*j*. In the stowed and/or deployed position, one or more portions of the dehumidifier system 10, 110 (e.g. dehumidifier) may be concealed and/or inoperable in the stowed position (e.g. within the tank). For example in the stowed position, the air inlet 21*g* and/or air outlet 21*h* may be at least partially covered by the tank or not in fluid communication to air flow. In the deployed position, the air inlet 21*g* and/or air outlet 21*h* may be uncovered and open to fluid communication through the dehumidifier.

In some embodiments, the condensate tank 30, 130 may be a variety of shapes, sizes, quantities, and constructions and still be within the scope of the invention. For example, the housing 31, 131 of the condensate tank may include one or more openings 35 into the volume 30*a* of the tank to receive or collet the condensate from the dehumidifier 20, 120. In some embodiments, an upper rim or top wall 32 of the housing 31, 131 may define the opening 35 into the volume 30*a* of the tank. The opening 35 may be opposite to a bottom wall 33 of the tank. The housing 31, 131 may define one or more side walls 34 extending upwardly from the bottom wall or base 33, or between the top wall 32 and bottom wall 33. The inner periphery 30*b* of the tank 30, 130, or portions thereof (e.g. side walls, bottom, top, etc.) may be in sliding or telescoping engagement with the outer periphery 20*a* of the dehumidifier. When in the deployed position, the condensate tank may be below the dehumidifier 20, 120 (e.g. side walls, bottom, top, etc.) as shown in the embodiments. Alternatively, the condensate tank may be positioned above the dehumidifier in some embodiments. The bottom wall 33 of the tank may be the base of the system adjacent to the ground/surface. In some implementations, the condensate tank may include one or more drains, drain lines, fill sensors, pumps, etc.

In some implementations, the dehumidifier system 10, 110, or portions thereof, may include one or more sensors 21*j* to determine the percentage/level of condensate in the condensate tank (e.g. volume). The one or more sensors may include a sonar, optical, electromechanical, mechanical, electrical, and/or float. The sensor, if used, may notify the user of the level of the condensate or to empty the condensate from the tank at one or more levels.

In some implementations, the dehumidifier system, or portions thereof may include one or more handles 21*a*. The handle 21*a*, if used, may allow the user to telescope one or more portions of the system, stow, deploy, transport, carry, store, and/or ship the system, or portions thereof. In various embodiments, the dehumidifier system (e.g. dehumidifier and/or condensate tank), or portions thereof, may include one or more hose connection structures. The hose connection structure (e.g. adaptors, fittings, gravity fed hose connection, etc.) may connect to a drain line. In some embodiments, the hose connection structure may be on the outside of the condensate tank and/or dehumidifier. In various embodiments, the side wall of the condensate tank may include an opening to pass a drain line therethrough from a hose connection structure in the bottom of the dehumidifier.

In some implementations, the dehumidifier system 10, 110, or portions thereof, may include one or more stacking features, arrangements, or structures 50. The stacking structure 50 may engage and/or disengage the dehumidifier with the condensate tank in one or more positions (e.g. deployed position, stowed position, telescoping positions, stacking positions, etc.). In various embodiments, as shown in system 10, the stacking structure 50 may be integral or fixed relative to one or more portions of the system. In some embodiments, as shown in system 110, the stacking structure 50 may be stowed and/or deployed between one or more positions to engage/disengage from one or portions of the system in one or more positions. The stacking structure 50 may interfere with or releasably fix/secure the telescoping or relative movement between the dehumidifier 20, 120 and condensate tank 30, 130 (e.g. housings) in one or more directions when in one or more orientations/positions therebetween.

In some embodiments, the stacking structure 50 may engage and/or disengage the dehumidifier 20, 120 and the condensate tank 30, 130 when in one or more positions. The stacking structure 50 may be engaged when in the deployed position (e.g. between the dehumidifier and the condensate tank, housings, etc.) as shown in FIGS. 4 and 7. In some embodiments, the stacking structure 50 may be disengaged when in the stowed position as shown in FIGS. 3 and 6. The stacking structure 50 may be a variety of shapes, sizes, quantities, positions, and constructions and still be within the scope of the invention. For example, the dehumidifier and/or the condensate tank may include a stacking structure, or portions thereof. The one or more stacking structures may be fixed/integral in position or movable between one or more positions (e.g. deployed and/or stowed) and still stack or nest the system between the deployed and stowed positions.

In some embodiments, the condensate tank 30, 130 may include the stacking structure 50, or portions thereof. In some implementations, the stacking structure may be integral or fixed in construction. As shown in the one embodiment in FIG. 4, the stacking structure 50 may be an interference of one or more structures limiting the movement (e.g. axial, laterally, radially, or telescoping) of the housings of the dehumidifier and/or the condensate tank. The stacking structure 50 of the condensate tank (e.g. side walls, top wall, inner periphery, etc.) may be a narrowing structure of the inner periphery, horizontal overlaps (e.g. outwardly and/or inwardly towards the axis A), or one or more axially stops to stack or engage the dehumidifier 20, 120 thereupon. For example, stacking structure 50 may be one or more protrusions, ledges, flanges, etc. may be used.

The one or more protrusion 52 may project inwardly (e.g. fixed) into the volume 30*a*. The one or more protrusions 52 may be adjacent the opening 35 and/or upper rim 32 of the condensate tank 30, 130. The stacking structure (e.g. protrusions) may engage the housing 21, 121 (e.g. bottom wall) of the dehumidifier 20, 120 when in the deployed position. The stacking structure (e.g. protrusions) may be disengaged from the dehumidifier in the stowed position and engaged with the dehumidifier in the deployed position. The stacking structure (e.g. protrusions) may be molded with the condensate tank in some embodiments as shown in FIG. 2. In some embodiments, the dehumidifier 20, 120 may include the stacking structure, or portions thereof. In some implementations, the stacking structure 50 of the dehumidifier may be integral or fixed in construction. As shown in FIGS. 2, 4, and 7, the housing 21, 121, (e.g. side walls, bottom wall, outer periphery, etc.) may be the stacking structure (e.g. wider dimension, horizontally overlaps, or be one or more stops) with the housing 31, 131 (e.g. protrusions) or stacking structure 50 (e.g. one or more positions or deployed protrusions) of the condensate tank.

In some implementations as shown in FIGS. 5-7, the one or more stacking structures 50, or portions thereof, may be positionable between one or more stowed positions and one or more deployed positions. The deployed position being different from the stowed position. When the stacking structure 50 is in the stowed position as shown in FIG. 6, the dehumidifier system 10, 110 may be telescoped (e.g. in at least one direction) and/or portions of the system (e.g. housings) thereof may be moved between a deployed position and a stowed position. When the stacking structure 50 is in the deployed position as shown in FIGS. 5 and 7, the dehumidifier system 10, 110, or portions thereof, may be stacked, releasably secured, or not allowed to telescope (e.g. in at least one direction, laterally, rotated, pivoted, etc.). In some embodiments, the stacking structure 50 may not be able to be deployed when in the stowed position as shown in FIG. 6.

As shown in the one embodiment in FIG. 5-7, the one or more stacking structures 50 may be in a position (e.g. project, fixed, or deploy) to stack or stop the telescoping portions of the dehumidifier system, or portions thereof. The dehumidifier 20, 120 and/or condensate tank 30, 130 may include one or more portions of the stacking structure. As shown in FIG. 6, when the stacking structure 50 is stowed the dehumidifier and/or condensate tank may be able to telescope and/or move between the stowed and deployed positions. The stacking structure may be one or more flanges, protrusions, catches, etc. engaging or disengaging from the correspondence structure when portions (e.g. dehumidifier and/or condensate tank) of the system are in their relative positions. The one or more protrusions 52, if moveable, may pivot (e.g. about a hinge 53 as shown in FIG. 6), slide, rotate, etc. between the deployed and stowed positions. In some embodiments as shown in FIGS. 6 and 7, the protrusions/flanges 52 pivot about a hinge 53 from the side wall 34 into the inner periphery 30*b* of the tank 130. The stacking structure may be automatic, motorized, and/or manual. For example, spring loaded or biased towards one or more positions (e.g. deployed). The stacking structure or pivoting of the protrusions 52 as shown in FIGS. 6 and 7 are manually repositioned between the stowed and deployed positions. The one or more protrusions may be moved to the deployed position (e.g. in the volume of the condensing unit, from the housing, side walls, etc.) when the dehumidifier is in the deployed position or separated from the condensate tank.

In some implementations, portions of the dehumidifier system may be in a variety of orientations between the stowed and deployed positions. In some embodiments, the relative orientation between the dehumidifier and the condensate tank may be the same. In various embodiments, the relative orientation between the dehumidifier and the condensate tank may be different. In the one embodiment shown in FIGS. 5-7, the orientation of the dehumidifier 120 and the condensate tank 130 remain in the same orientation (e.g. about the axis A) in both the stowed position and the deployed position or in the different elevations. However, the orientations of the portions of the dehumidifier system may change in some embodiments between one or more positions (e.g. when stacked, nested, telescoping, and/or stacking structures engaged/disengage). In the one embodiment shown in FIGS. 1-4, the orientation of the dehumidifier 20 and the condensate tank 30 are in different orientations (e.g. about the axis A) in both the stowed position and the deployed position or in the different elevations. For example, the dehumidifier 20 and/or condensate tank 30 is in a first orientation (e.g. first pivot position about the axis A) in the stowed position and at least one of the dehumidifier 20 or condensate tank 30 is in a second orientation (e.g. second pivot position about the axis A) in the deployed position, wherein the second orientation is different from the first orientation. Moreover, for example, the tank could be turned upside-down or inverted between the stowed and deployed position in some applications. Moreover, although not shown, the tank could be inverted and the downwardly facing opening 35 may receive the top end or wall 22 of the dehumidifier when stowing/nesting.

In some embodiments, the relative orientation of portions of the dehumidifier system 10 may allow or not allow telescoping therebetween and/or engage/disengage the one or more stacking structures 50. As shown in FIG. 3, the stacking structure 50, or one or more portions of the system 10, is out of engagement or in a first orientation and allows telescoping from the stowed position towards the deployed position. One or more recesses/notches/channels 25 in the side walls 24 of the dehumidifier housing slidingly engages or telescopes with the one or more protrusions 52 when in the first orientation (e.g. first pivot position). As shown in FIGS. 1, 2, and 4, when the stacking structure 50, or one or more portions of the system 10, is in engagement or in a second orientation (e.g. second pivot position) telescoping is not allowed in at least one direction from the deployed and/or stacked position. The housings 21, 31 and/or stacking structure 50, or portions thereof, may be pivoted (e.g. between two or more orientations) about the longitudinal axis A to orientate the dehumidifier 20 relative to the condensate tank 30 to allow for telescoping along the axis A (e.g. when the one or more stacking structures are misaligned) and to not allow for telescoping along the axis A (e.g. when the one or more stacking structures are aligned). The dehumidifier may be in the first orientation relative to the condensate tank in the stowed position and a second orientation relative to the condensate tank when in the deployed position, wherein the first orientation is different from the second orientation. Alternatively, the orientation of the portions of the dehumidifier system may remain the same when in the deployed and stowed positions (see FIGS. 5-7 for example).

In use, the dehumidifier 20, 120 may be lifted out of the nested relationship with the condensate tank 30, 130 and reconfigured to the top of the tank allowing condensate to drain from the dehumidifier into the tank. When the dehumidifier system 10, 110 is in the stowed position, the housing

21, 121 of the dehumidifier 20, 120 may be telescoped or deployed away from the housing 31, 131 of the condensate tank 30, 130 to a deployed position. Telescoping may include axial and/or pivoting relative movement about one or more axis A between one or more orientations. The user may lift or raise the dehumidifier 20, 120 up and away from the inner periphery of the condensate tank 30, 130 via one or more handles 21*a*, if used. The dehumidifier may move away from or be elevated (e.g. vertically along axis A, telescoping engagement, etc.) to a higher elevation from the stowed position to the deployed position. A portion of the volume 30*a* of the housing of the condensate tank may be unoccupied in order to filled with condensate by distancing away from or telescoping the housing, or portion thereof, of the dehumidifier from the tank. The stacking structure 50 between the houses of the dehumidifier and the condensate tank may be engaged. Once the dehumidifier reaches a deployed position (e.g. housings separated and/or not separated from each other), the one or more stacking structures 50 may be deployed from a stowed position to a deployed position, if needed as shown in FIGS. 5-7. If the stacking structure 50 is fixed or integrated within the system or one or more housings as shown in FIGS. 1-4, the dehumidifier may be placed upon or engage the stacking structure with the dehumidifier in a deployed position. The orientation of the dehumidifier/condensate tank may be same between the stowed and deployed positions at shown in FIGS. 5-7. Alternatively, the dehumidifier system (e.g. dehumidifier and/or tank) may change orientations between the stowed and deployed positons. In some embodiments as shown in FIGS. 1-4, the dehumidifier may change orientations relative to the condensate tank. For example, the dehumidifier 20 may be axially lifted from first pivot position in the stowed position to the deployed position by pivoting about the axis A to a second pivot position thereby aligning or engaging the stacking structures before stacking the two housings, etc. into a deployed position. Alternatively, the user may change the condensate tank's orientations relative to the dehumidifier. The user may also disengage and/or stow the stacking structure to return the dehumidifier to the stowed positon. Moreover, the user may also change relative orientations of the portions (e.g. dehumidifier and/or condensate tank) in some embodiments to return the system to the nesting position. In operation, when the condensate tank is filled or to a level signaled by one or more sensors, if any, the dehumidifier may be removed from the condensate tank or stacking structure and subsequently emptied. In some embodiments, a drain line or other structure, if used, may drain from the condensate tank with or without removing the dehumidifier from the tank. Once the dehumidifier system is desired to be stored and/or transported, the user may remove the dehumidifier 20, 120 from the stacking structure 50 and insert/nest the housing 21, 121 of the dehumidifier 20, 120 into the housing 31, 131 of the condensate tank 30, 130 (e.g. stowed position).

In some implementations as shown in FIGS. 8-17, the dehumidifier system 210 may include a pick-up or water pumping operation when in the deployed/operating position. The dehumidifier system 210, or portions thereof, may include a pump 211 and a suction pipe 212 (e.g. docking pipe 70, docking member 60, etc.) in fluid communication with the water collected within the condensate tank. In some embodiments, an outlet 213 of the dehumidifier housing 221 may be in downstream fluid communication with the pump 211/pipe 214 and fluidly connected to a downstream hose or tube 215, if used, to empty towards a drain or predetermined location. In some embodiments, the suction pipe 212 may include a docking pipe 70 and/or a docking member 60 upstream of the pump 211. The fluid or water may be pumped (e.g. by the pump) away from the condensate tank housing through the suction pipe (e.g. docking pipe, docking member, etc.), or portions thereof, extending through one or more stacking features 50 and/or lock mechanisms 80. At least one of the dehumidifier 220 (e.g. housing 221) and/or the condensate tank 230 (e.g. housing 231) may include the docking pipe 70 and the other of the tank 230 or dehumidifier 220 may include the docking member 60. As shown in the one embodiment in FIGS. 8-17, the condensate tank 230 may include one or more docking pipes 70 and the dehumidifier 220 may include one or more docking members 60. The telescoping engagement 40 (e.g. axial, vertical, telescoping) between the docking pipe 70 and the docking member 60 may be a female/male connection. At least one of the docking pipe 70 and docking member 60 may be a female end/connector and the other one of the docking pipe 70 and docking member 60 may be a male end/connector. As shown in the one embodiment in the Figures, the docking pipe 70 includes the male end of the connector and the docking member 60 includes the female end. The docking member 60 and the docking pipe 70 may be sealingly and/or releasably engaged (e.g. telescoped, axially, vertically) therebetween, when the housings 231, 221 of the tank 230 and dehumidifier 220 are telescoped in relation to each other, deployed, and/or axially engaged. In some embodiments, the system (e.g. dehumidifier, condensate tank, etc.), or portions thereof, may include a seal/gasket engagement 216 at the connection between the docking member 60 and the docking pipe 70. For example as shown in the one embodiment, the gasket engagement 216, if used, may be one or more O-rings. The seal/gasket engagement 216 may seal the docking member to the docking pipe when in the second orientation, deployed position, and/or when telescoping the dehumidifier housing and/or docking pipe relative to the condensate tank housing and/or docking member along the vertical axis A.

In some implementations, the telescoping engagement 40 (e.g. along an axial/vertical axis or direction) between the housings 221, 231 of the dehumidifier 220 and the condensate tank 230 engages (e.g. sealingly, axially, vertically, telescoping) the one or more docking members 60 and/or docking pipes 70 with each other to fluidly connect the water within the condensate tank 230 with the downstream drainage system (e.g. pump 211, outlet 213, hose 215, and/or pipe 214). The telescoping engagement 40 of the housing 221 of the dehumidifier 220 with the housing 231 of the condensate tank 230 along the vertical axis A (e.g. deployed/operating position) sealingly/releasably telescopes/engages the docking member 60 of the dehumidifier 220 (e.g. housing) with the docking pipe 70 of the condensate tank 230 (e.g. housing). Further, when the telescoping engagement 40 separates the housing of the dehumidifier away from the housing of the condensate tank along the vertical axis A (e.g. away from the deployed/operating position) the docking member 60 disengages/unseals/telescopes from the docking pipe 70.

In some implementations, the dehumidifier system 210, dehumidifier 220, and/or condensate tank 230 may include at least one docking member 60. In the one embodiment shown, the housing 221, or portions thereof, of the dehumidifier 220 may include one or more docking members 60. The docking member 60 may include an inlet end 60*a* distal to the pump 211 and an outlet end 60*b* proximal to the pump 211. A through opening 61 may interconnect the inlet end 60*a* (e.g. inlet opening) and the outlet end 60*b* (e.g. outlet opening). The docking member 60, or portions thereof, may be upstream of the pump 211 within the dehumidifier housing 221. The bottom wall 23 of the dehumidifier housing 221 may include or define the docking member 60, through opening 61, outlet end 60*b*, and/or inlet end 60*a*, or portions thereof. The inlet end 60*a*, outlet end 60*b*, though opening 61, or docking member 60 may be in a variety of locations within the bottom wall 23 and/or housing 221 and still be within the scope of the invention. The inlet end 60*a* or docking member 60 may define one or more inlet openings, apertures, or receptacles 60*c* for receiving the docking pipe 70, or portions thereof. The inlet end 60*a* may define an inlet opening 60*c* of the through opening 61 and the outlet end 60*b* may define an outlet opening 60*d* of the through opening 61. The inlet opening 60*c* or docking member 60 may face downwardly or be orientated along the vertical axis A. The inlet end 60*a* may be positioned to extend or receive the docking pipe 70 along the vertical axis A or telescoping direction. The inlet end/opening 60*c* or through opening 61 (e.g. female connection) may be conical or tampered to narrow in the upwardly direction away from the tank 230 to aid in alignment/engagement with the docking pipe 70 when vertically telescoping/engaging the docking pipe (e.g. male end) with the docking member (e.g. female end). The outlet end 60*b* of the docking member 60 may be in fluid communication with the pump 211 via one or more hoses or devices 214. One or more portions of the docking member may be integral with the housing or may be of a separate construction or member. The dehumidifier 220 may carry one or more portions of the docking member between the stowed and/or deployed positions.

In some implementations, the dehumidifier system 210, dehumidifier 220, and/or condensate tank 230 may include at least one docking pipe 70. In the one embodiment shown, the housing 231, or portions thereof, of the condensate tank 230 may include one or more docking pipes 70. The docking pipe 70 may include an inlet end 70*a* and an opposing outlet end 70*b*. The outlet end 70*b* may be positioned adjacent the top wall 32 (e.g. defining the top opening) and the inlet end 70*a* may be adjacent the bottom wall 33. In some embodiments, the docking pipe 70 may be substantially vertical or extend along the vertical axis/direction A. The docking pipe 70 may include a through opening 71 extending from the inlet end 70*a* to the outlet end 70*b*. The inlet end 70*a* may define an inlet opening 70*c* of the through opening 71 and the outlet end 70*b* may define an outlet opening 70*d* of the through opening 71. The inlet opening 70*c* and/or outlet opening 70*d* may face upwardly/downwardly, respectively, or be orientated along the vertical axis. The outlet end 70*b* of the docking pipe 70 may be positioned to extend or be receive by the docking member 60 along the vertical axis or telescoping direction A. The outlet end 70*b* or opening 70*d* may extend or face upwardly along the vertical axis A. When engaged or in the deployed/operating position as shown in FIGS. 8, 11, 12, and 15, the through openings 61, 71 of both the docking member 60 and the docking pipe 70 may be in fluid communication with each other. The docking pipe, outlet end 70*b*/opening 70*d*, or through opening 71 may have an exterior that may be conical or tampered to narrow in the upwardly direction away from the bottom wall 33 of the tank to aid in alignment/engagement with the docking member 60 (e.g. taper, if used) when vertically telescoping/engaging the docking pipe (e.g. male end) with the docking member (e.g. female end). The docking pipe 70 may be a single member as shown in the one embodiment in FIGS. 8-17. Alternatively, the docking pipe 70 may be a plurality of members in some embodiments. The one or more portions/members of the docking pipe 70 may be integral (e.g. molded) with the housing 231 of the tank 230, or portions thereof, and/or may be of a separate construction or member attached to the tank 230. The condensate tank 230 may carry one or more portions of the docking pipe between the stowed and/or deployed positions.

Figure 10:
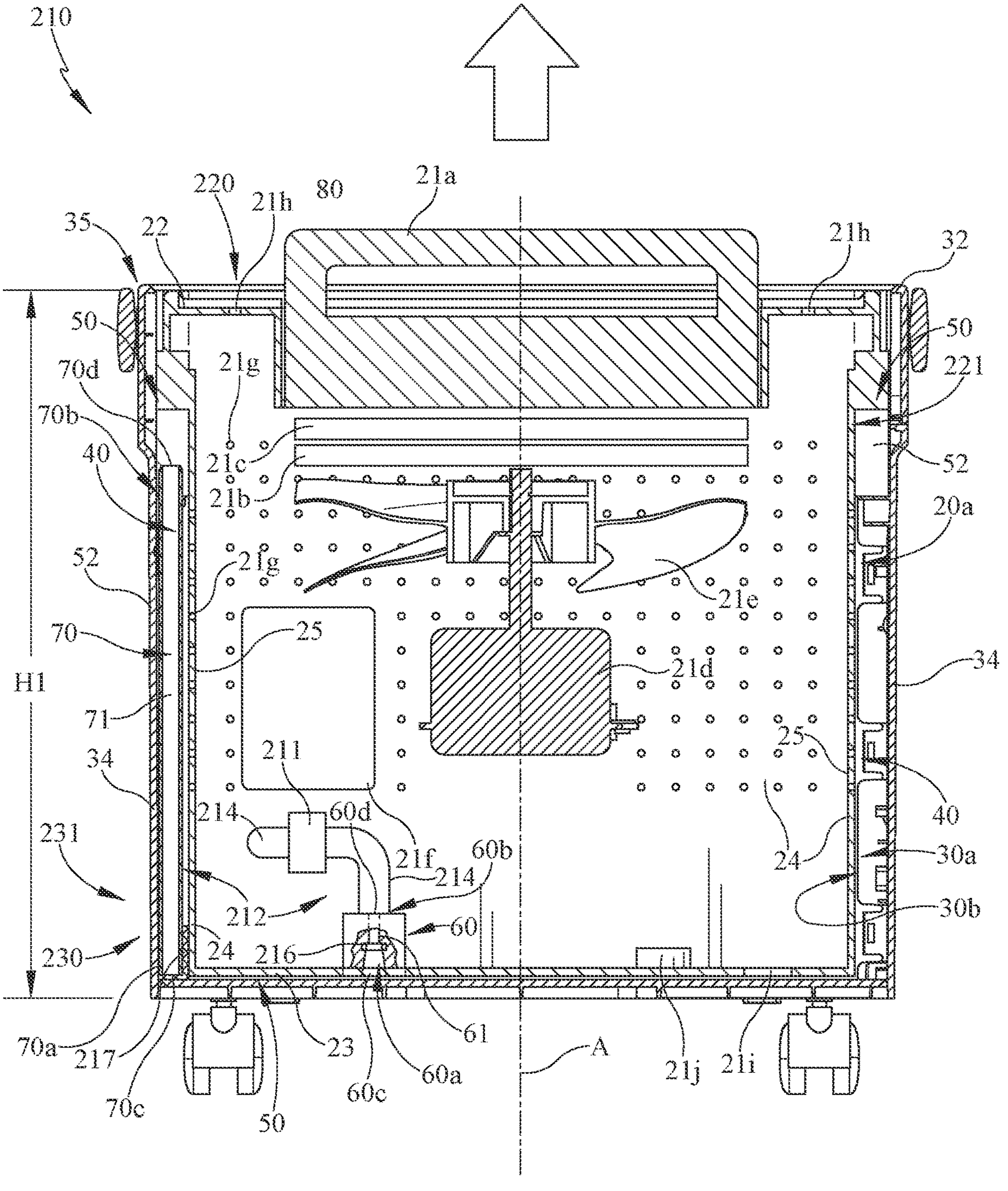
FIG. 10 is sectional view of dehumidifier system in a stowed position taken along line 10A-10A of the dehumidifier of FIG. 9 and line 10B-10B of the condensate tank of FIG. 9, illustrating a nesting relationship and/or a first orientation between the dehumidifier and the condensate tank with one or more stacking structures and/or docking pipe/member misaligned/disengaged.
Figure 13:
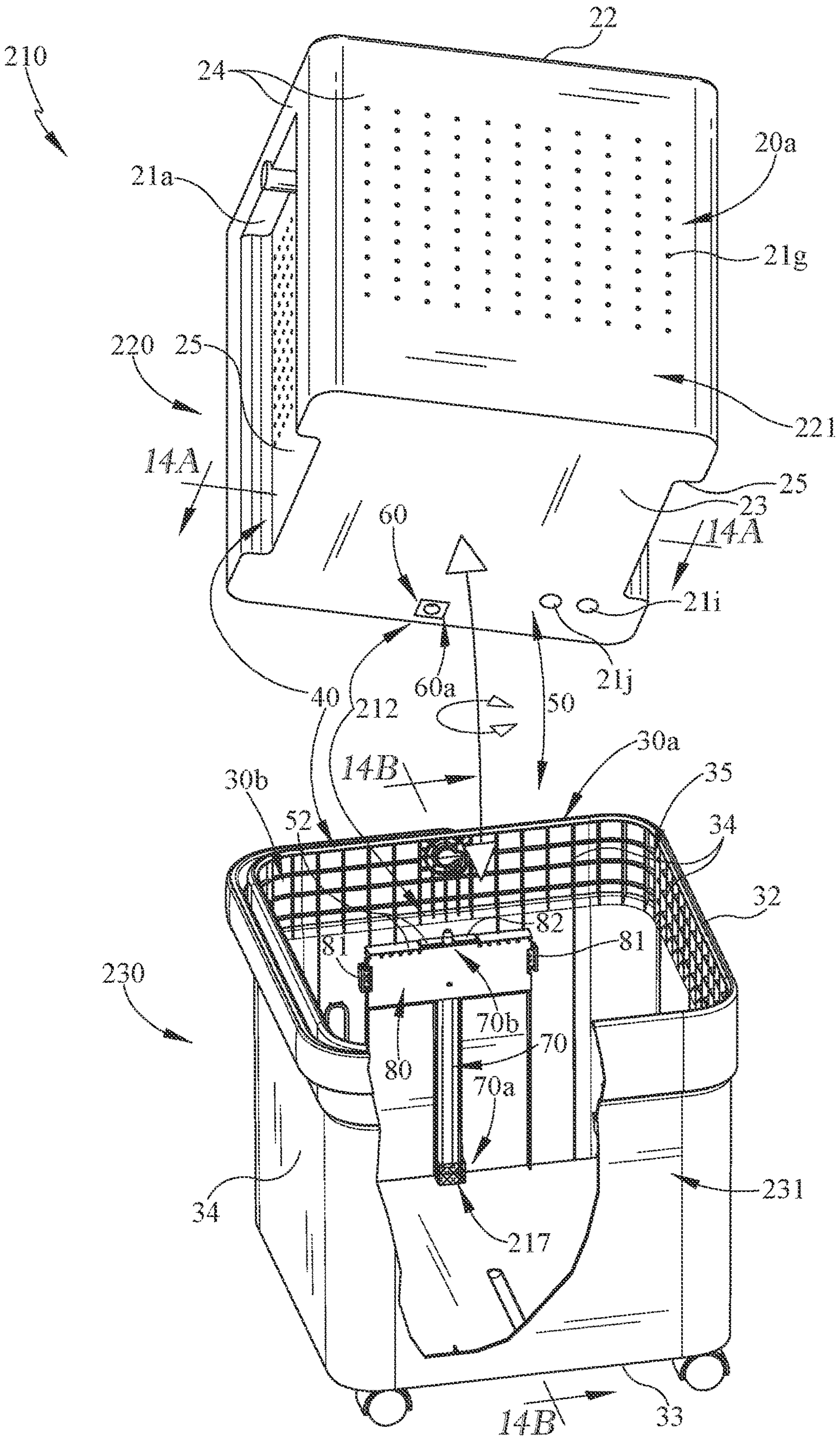
FIG. 13 is an exploded view of the dehumidifier system of FIG. 12 with the dehumidifier exploded away from the condensate tank, and illustrating the lock mechanism deployed.
Figure 14:
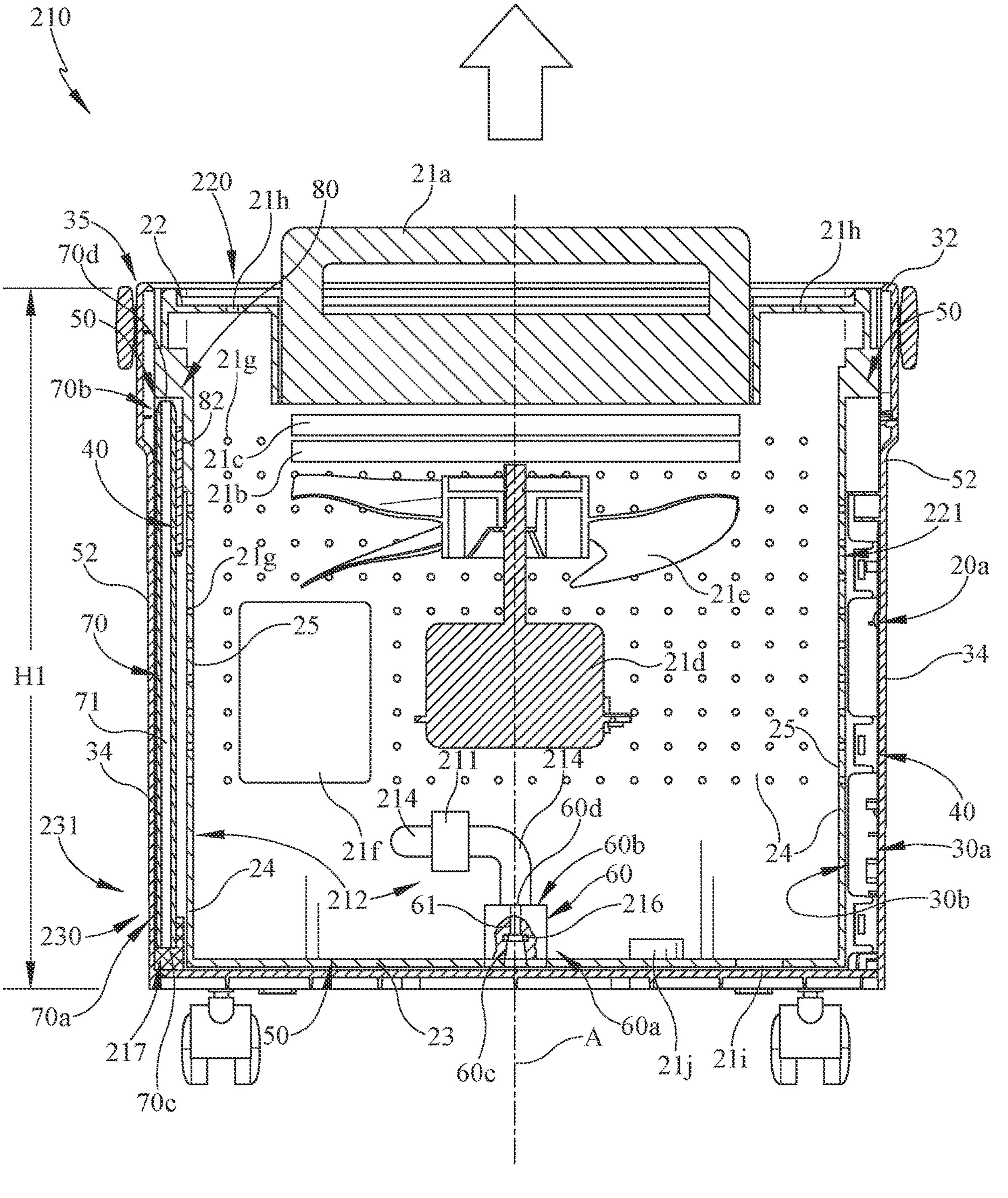
FIG. 14 is sectional view of dehumidifier system in a stowed position taken along line 14A-14A of the dehumidifier of FIG. 13 and line 14B-14B of the condensate tank of FIG. 13, illustrating a nesting relationship and/or a first orientation between the dehumidifier and the condensate tank with one or more stacking structures and/or docking pipe/member misaligned/disengaged.

In some embodiments, the one or more docking pipes 70 and/or docking members 60 may be of a variety of shapes, sizes, quantities, constructions, and positions relative to the dehumidifier system 210, or portions thereof. Although the docking pipe 70 is shown adjacent the inner periphery 30*b*/side walls 34/inner surfaces of the condensate tank housing 231, it should be understood that the docking pipe may be in a variety of positions with the tank 230. As shown in the one embodiment in FIGS. 8-17, the docking pipe 70 may be positioned adjacent to and/or vertically aligned/overlapped with the support/stacking structure 50, or portions thereof. More specifically, the docking pipe 70 may extend through the ledge/protrusion 52 of the support/stacking structure 50. The outlet end 70*b* of the docking pipe 70 may be at a higher elevation and/or projecting upwardly from the ledge, protrusion 52, or stacking feature 50. The inlet end 70*a* may be at a lower elevation and/or project downwardly from the ledge, protrusion 52, or stacking feature 50. The docking pipe 70 and/or protrusions 52 may then be received within or slidingly engages or telescopes within the notch 25 in the side wall 24 when in the first orientation (e.g. first pivot position) and/or stowed position as shown in FIGS. 10 and 14. The docking pipe 70 may be in the center of the stacking feature 50 and/or lock mechanism 80 along the inner periphery 30*b* of the tank 230 as shown in the one embodiment in FIGS. 12-17. Alternatively, the docking pipe 70 may be offset or spaced away from the center of the stacking feature 50 (e.g. protrusion) along the inner periphery 30*b* of the tank 230 as shown in the one embodiment in FIGS. 8-11. In some embodiments, the docking pipe may extend adjacent to the stacking feature and not extend therethrough. Although a single docking pipe 70 and/or docking member is shown in the one embodiment, it should be understood that a variety of quantities may be used. For example, each protrusion 52 may include a docking pipe 70 adjacent thereto. It should be understood that the docking member may be positioned within a variety of locations within the dehumidifier and still be within the scope of the invention.

Figure 12:
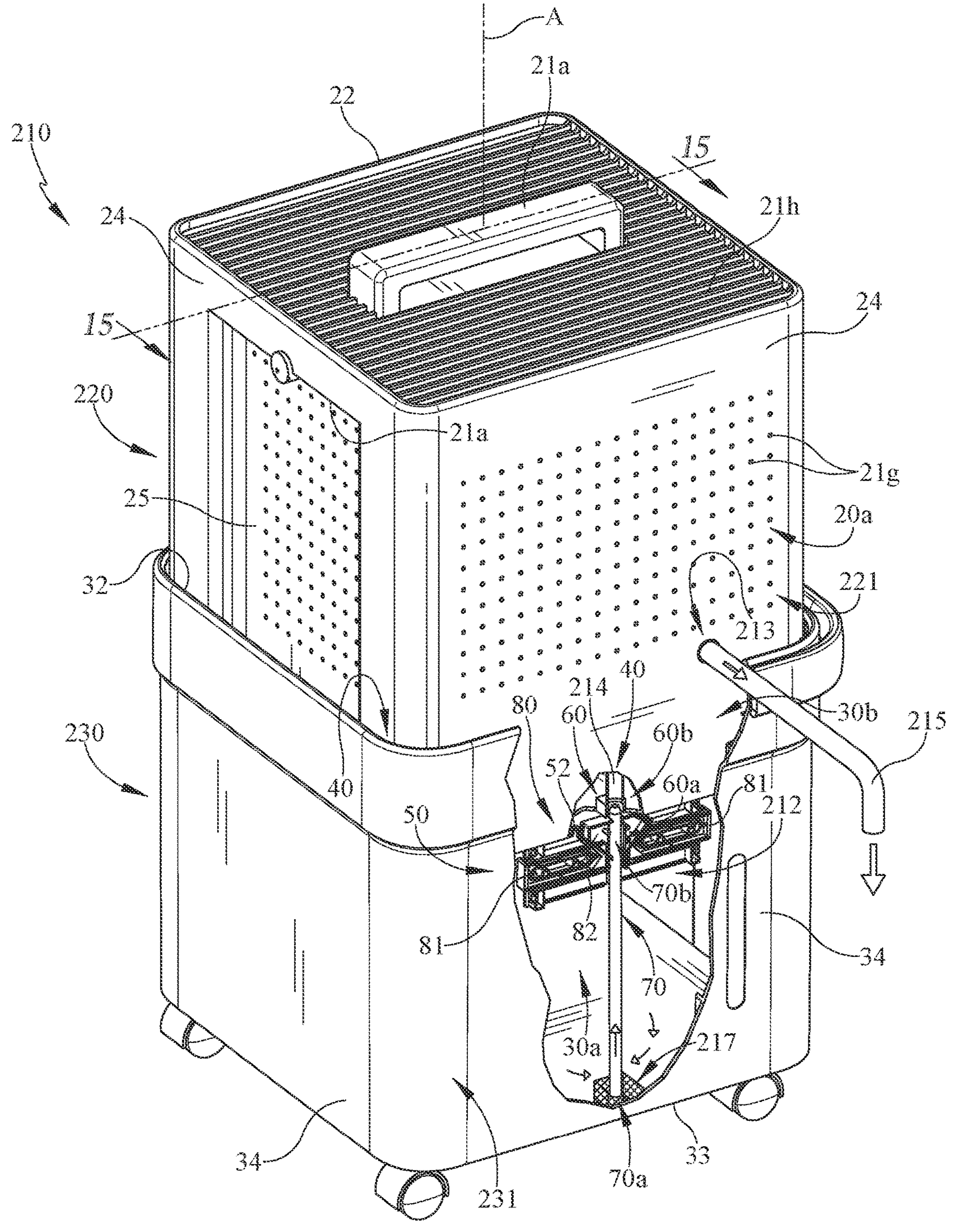
FIG. 12 is a perspective view of another embodiment of a dehumidifier system in a deployed and/or operating position, illustrating a pump pick-up with an embodiment of a dehumidifier stacked with an embodiment of a condensate tank.
Figure 15:
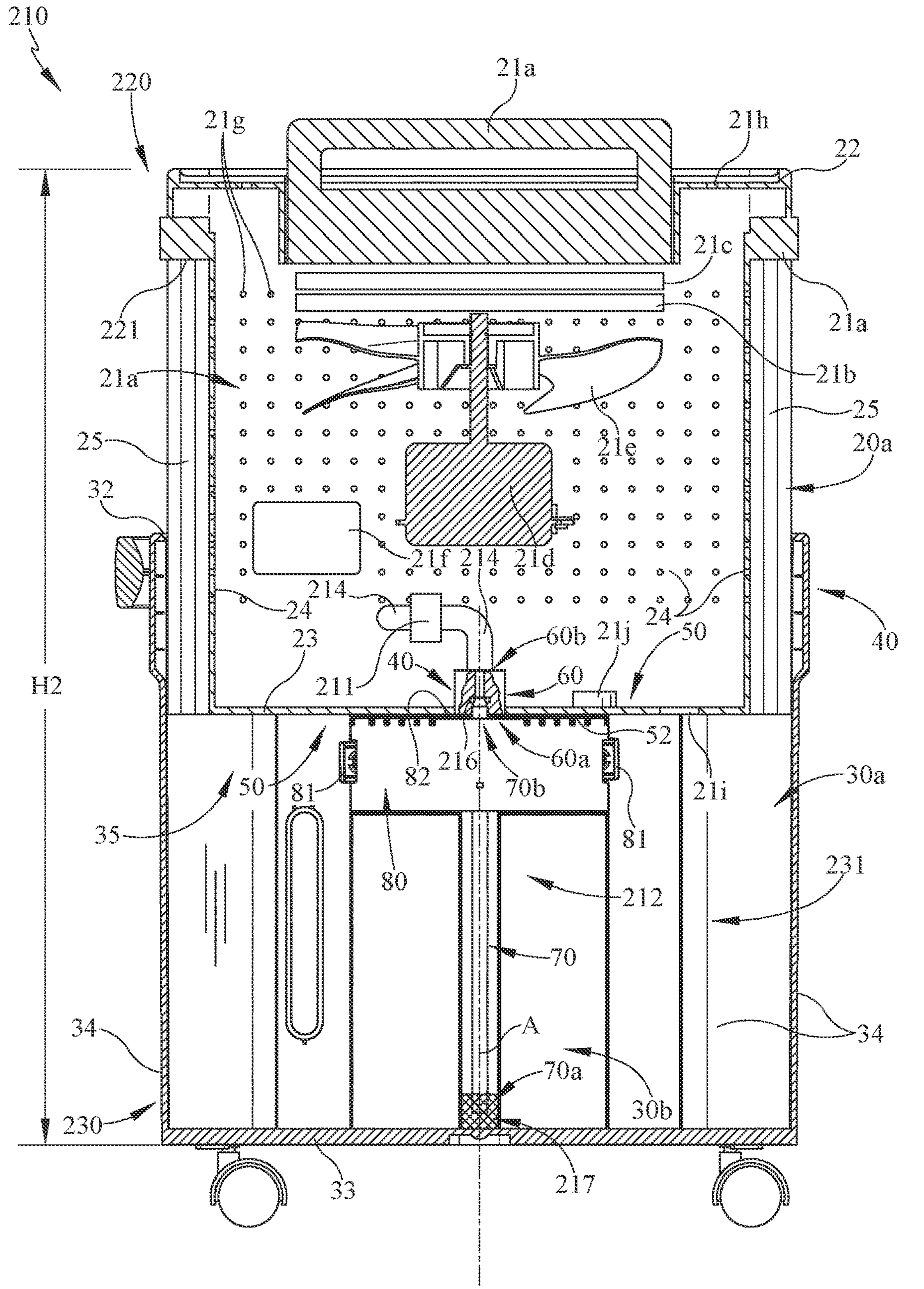
FIG. 15 is a sectional view of dehumidifier system in the deployed position taken along line 15-15 of FIG. 12 illustrating the stacking relationship and/or a second orientation between the dehumidifier and the condensate tank with one or more stacking structures and docking pipe/member aligned/engaged, and illustrating the lock mechanism deployed.
Figure 16:
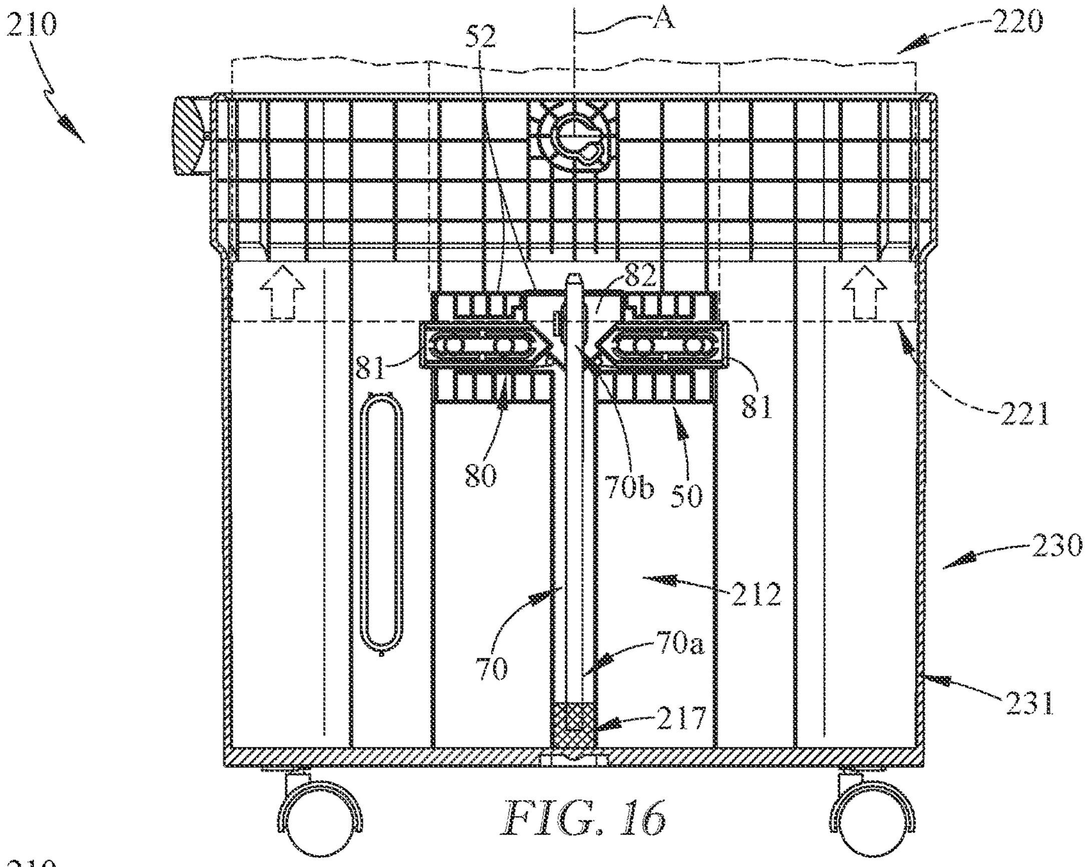
FIG. 16 is a sectional view of dehumidifier system in the deployed position illustrating the first orientation between the dehumidifier and the condensate tank, and the lock mechanism in the deployed position to prevent stowing of the dehumidifier housing towards the stowed position with the condensate tank housing.
Figure 17:
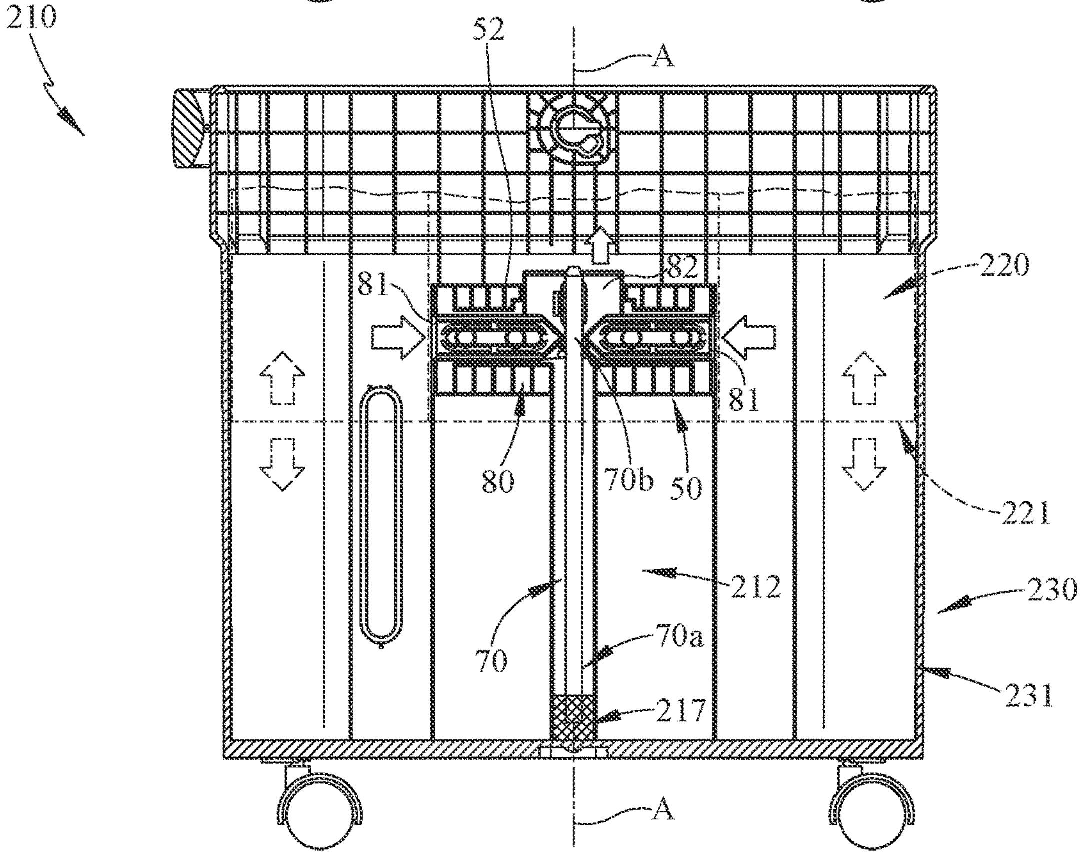
FIG. 17 is a sectional view of dehumidifier system in the deployed position of FIG. 16 illustrating the first orientation between the dehumidifier and the condensate tank, and the lock mechanism in the stowed position to allow stowing of the dehumidifier housing towards the stowed position with the condensate tank housing.

In some embodiments, the stacking feature 50 and/or system 210, or portions thereof, may include one or more locks or lock mechanisms 80 to prevent stowing of the dehumidifier housing 221 towards the stowed position with the condensate tank housing 231. As shown in the one embodiment in FIGS. 12-16, the lock mechanism 80, if used, may prevent or not allow the dehumidifier housing 221 to telescope from the deployed position to the stowed position when in the first orientation (e.g. first pivot/rotational position when the notches/docking pipes are aligned with the corresponding recesses). For example as shown in FIG. 16, if and when water is present in the condensate tank housing, the lock mechanism 80 may interfere with or stop the telescoping engagement between the condensate tank and the dehumidifier, or the telescoping towards the stowed position when in the first orientation. In the one embodiment shown, the lock mechanism 80 may include lateral projection member(s) 81 extending laterally from the protrusion 52 or stacking feature 50 and a wedge 82 operably engaging both projection members 81. When the dehumidifier housing 221 is orientated to the second orientation and nested on the protrusions 52 as shown in FIGS. 12, 13, and 15, the lock mechanism 80/wedge 82, if used, is actuated downwardly by the force of the telescoping/engaging housings to engage and extend both projection members 81 laterally from the protrusion 52 or stacking feature 50, and each other 81. As shown in the one embodiment in FIG. 17, once the lateral projection members 81 are actuated by the wedge 82, the user pushes/stows/returns the opposing projection members 81 into the lock mechanism 80/protrusion 52/stack feature 50 to remove the interference to telescope in the first orientation or when stowing towards the stowed position.

In some implementations as shown in FIGS. 8-17, the docking pipe 70, or portions thereof, may be adjacent the lock mechanism 80 and/or stacking feature 50 about the inner periphery **30*b* of the condensate tank housing 231. The docking pipe 70 may extend through the stacking feature 50 (e.g. protrusion 52) and/or lock mechanism 80 (e.g. wedge 82, projection member 81), if used. The docking pipe 70 (e.g. outlet end 70*b*) may project upwardly (e.g. vertically) from the stacking feature 50 (e.g. protrusion 52) and/or lock mechanism 90 (e.g. wedge, projection members). The docking pipe 70 (e.g. outlet end 70*b*) may project downwardly (e.g. vertically) from the stacking feature 50 (e.g. protrusion 52) and/or lock mechanism 90 (e.g. wedge, projection members). As shown in the one embodiment in FIGS. 12-17, the docking pipe 70 (e.g. outlet end 70*b*), or portions thereof, may extend vertically through the lock mechanism 80/wedge 82 (e.g. center) and/or protrusion 52. The wedge 82 may move (e.g. vertically) relative to the vertically orientated docking pipe 70 and/or protrusion 52. The wedge 82 may extend around or on opposing sides of the docking pipe 70 along the inner periphery 30*b***.

In some implementations, the docking pipe 70, condensate tank 230, and/or dehumidifier system 210 may include one or more screens/filters 217. As shown in the one embodiment, the screen 217, if used, may be positioned adjacent to the inlet end **70*a* of the docking pipe 70, bottom wall 33, adjacent the inner periphery 30*b* of the condensate tank housing 231, and/or adjacent the stacking feature 50 (e.g. protrusion 52). The one or more screens 217, if used, may be positioned upstream of the one or more inlet ends 70*a* or inlet openings 70*c* of the docking pipe 70. Alternatively, or in combination with the upstream screen 217**, one or more additional screens may be positioned downstream of the docking pipe (e.g. outlet end). The screen may reduce particulates of a predetermined size from entering the inlet end of the docking pipe.

In some implementations, the docking pipe 70 and/or docking member 60 may be orientated between one or more positions relative to one or more portions of the dehumidifier system 210 (e.g. one or more portions of the docking pipe 70, housing 221, 231, docking member 60, notch 25, protrusion 52, stacking structure 50, etc.) to telescope between the stowed and/or deployed positions. As shown in FIGS. 8, 9, 11, 12, 13, and 15, the docking pipe 70 may be aligned and/or engaged (e.g. axially, vertically) with the docking member 60 when the dehumidifier housing 221 and/or docking member 60/pipe 70 is in a second orientation (e.g. pivot/rotational position) about the vertical axis A and/or when in the deployed position relative to the condensate tank housing 231 and/or docking member 60/pipe 70. The docking member 60 of the dehumidifier housing 221 may be in the second orientation, different from the first orientation, about the vertical axis A relative to the condensate tank housing 231 and/or docking pipe 70 when in the deployed position. The docking pipe 70 of the condensate tank housing 231 may be in the second orientation, different from the first orientation, about the vertical axis A relative to the dehumidifier housing 221 and/or docking member 60 when in the deployed position. As shown in FIGS. 10 and 14, the docking pipe 70 may be misaligned and/or disengaged (e.g. axially, vertically) with the docking member 60 when the dehumidifier housing 221 and/or docking member 60/pipe 70 is in a first orientation (e.g. pivot/rotation position) about the vertical axis A and/or when in the stowed position relative to the condensate tank housing 231 and/or docking member 60/pipe 70. The docking member 60 of the dehumidifier housing 221 may be in the first orientation, different from the second orientation, about the vertical axis A relative to the condensate tank housing 231 and/or docking pipe 70 when in the stowed position. The docking pipe 70 of the condensate tank housing 231 may be in a first orientation, different from the second orientation, about the vertical axis relative to the dehumidifier housing and/or docking member when in the stowed position.

When in the stowed position, first orientation, and/or in a telescoping engagement, the bottom wall 23 and/or the docking member 60 of the dehumidifier housing 221 may be adjacent the bottom wall 33 of the condensate tank housing 231 and/or inlet end **70*a* of the docking pipe 70. Further, the dehumidifier system 210 may include a reduced overall or first height H1 as shown in FIGS. 10 and 14. Moreover, the docking pipe 70 and/or stacking structure 50 (e.g. protrusion 52) may be received or slidably engaged with the recesses/notches 25 of the dehumidifier housing 221 or side wall 24 as shown in FIGS. 10 and 14. In some embodiments, the outlet end 70*b* of the docking pipe 70 may be positioned adjacent the top wall 22 of the dehumidifier housing 221** when in the stowed position.

Figure 11:
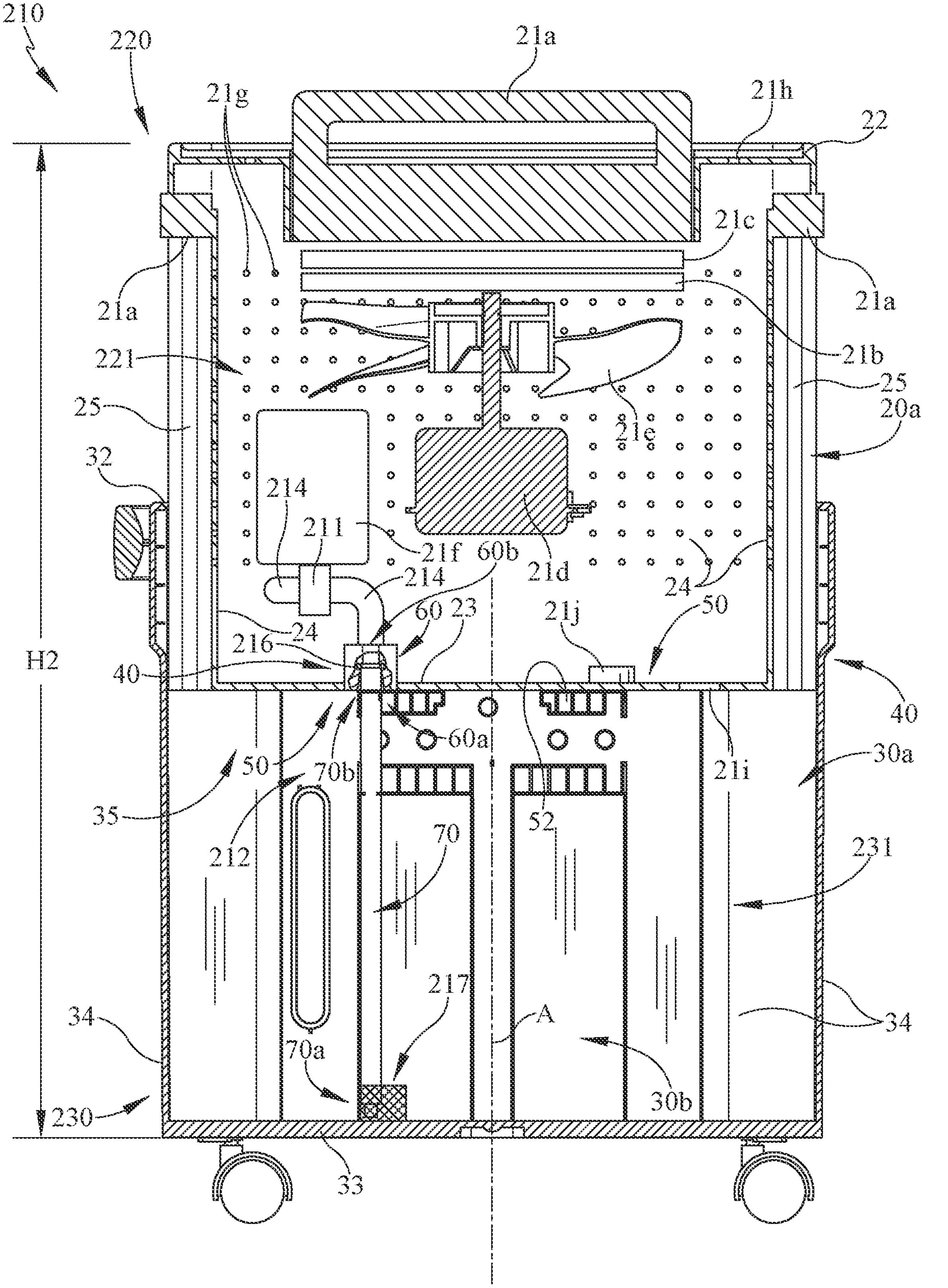
FIG. 11 is a sectional view of dehumidifier system in the deployed position taken along line 11-11 of FIG. 8 illustrating the stacking relationship and/or a second orientation between the dehumidifier and the condensate tank with one or more stacking structures and docking pipe/member aligned/engaged.

When in the deployed position, second orientation, and/or in a telescoping engagement, the bottom wall 23 and/or the docking member 60 of the dehumidifier housing 221 may be adjacent the top wall 32 of the condensate tank housing 231 and/or outlet end **70*b* of the docking pipe 70. This may position the docking member 60 (e.g. inlet end 60*a*) in axial/sealing engagement with the outlet end 70*b* of the docking pipe 70 along the vertical axis A as shown in FIGS. 8, 9, 11, 12, 13, and 15. Further, the dehumidifier system may include an increased overall or second height H2 as shown in FIGS. 11 and 15. Moreover, the docking pipe 70 and/or stacking structure 50 (e.g. protrusion 52) may be positioned out of or disengaged with the recesses/notches 25 of the dehumidifier housing 221 in the deployed position and/or second orientation. In some embodiments, the inlet end 70*a* of the docking pipe 70 and/or top wall 32 may also be positioned adjacent the bottom wall 23 and/or docking member 60 of the dehumidifier housing 221** when in the deployed/operating position.

In some embodiments, the axial/telescoping engagement (e.g. vertical) between the docking member(s) and the docking pipe(s) may occur in one or more positions or orientations about the vertical axis. As shown in the one embodiment in FIGS. 8, 9, 11-13, and 15, the axial engagement 40 between the docking member 60 and the docking pipe 70 may occur in a single rotational/pivot position or orientation about the vertical axis A in the deployed position of the dehumidifier system 210. It should be understood that more than one position about the vertical axis may vertically engage one or more docking members with one or more docking pipes.

In use, the dehumidifier housing 221 may be stowed in the condensate tank housing 231. In the stowed position, the docking pipe(s) 70 and member(s) 60 may be misaligned or not in fluid communication with each other. For example, this may be the first orientation between structure in the stowed position. The user may telescope the dehumidifier housing 221 to at least one deployed position to engage/align (e.g. axially, vertically, releasably) the docking pipe(s) 70 and member(s) 60 in fluid communication with each other. For example, this may be the second position in the deployed position. The telescoping engagement 40 along the vertical axis A may engage/disengage (e.g. releasably and/or axially) the docking member from the docking pipe. Telescoping the dehumidifier housing 221 and/or docking member 60 vertically along the vertical axis A into and out of engagement with the condensate tank housing 231 and/or docking pipe 70 may sealingly engage the docking member 60 with the docking pipe 70 and/or deploy the lock mechanism 80, if used. Further, the gasket engagement 216 may be engaged between the docking member and the docking pipe when deployed, telescoped, or axially engaged. In the deployed position, the stacking features 50 of the dehumidifier 220 and the condensate tank 230 may be engaged. When in the deployed position, the collected water/fluid may be pumped through the docking pipe 70 and/or subsequently through the docking member 60 by the pump 211. The docking pipe 70 and/or docking member 60 may extend or pass through the stacking features 50 (e.g. protrusion 52) and/or lock mechanism 80, if used. The pump 211 may discharge the water through the one or more pipes 214 and/or outlet 213 of the dehumidifier housing 221 via the tube/hose 215, if used. When stowing, the user may stow the lock mechanism 80 (e.g. projection members 81) to telescope the dehumidifier housing 221 (e.g. docking pipe/member) with the condensate tank housing 231 (e.g. docking pipe/member). The docking pipe 70 may stow or slide within the notch 25 or between the sidewalls of the dehumidifier housing and the condensate tank housing when in the stowed position.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding,"

"composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A dehumidifier system comprising:

a dehumidifier having a housing, a pump, and a docking member;

a condensate tank having a housing defining a volume therein and a docking pipe;

a telescoping engagement of the housing of the dehumidifier along a vertical axis with the housing of the condensate tank, and wherein the telescoping engagement along the vertical axis sealingly engages the docking member of the dehumidifier with the docking pipe of the condensate tank; and wherein the docking member includes an inlet end upstream of the pump of the dehumidifier housing, wherein the inlet end is adjacent a bottom wall of the dehumidifier housing and defines an inlet opening facing downwardly along the vertical axis.

2. The dehumidifier system of claim 1 wherein the telescoping engagement disengages the docking member of the dehumidifier with the docking pipe when separating the dehumidifier housing from the condensate tank housing along the vertical axis.

3. The dehumidifier system of claim 1 further comprising a stacking structure between the dehumidifier and the condensate tank when in a deployed position, wherein the stacking structure stops the telescoping engagement between the condensate tank and the dehumidifier, and wherein the docking pipe is positioned adjacent the stacking structure about an inner periphery of the condensate tank housing.

4. The dehumidifier system of claim 3 wherein the docking pipe includes an outlet end projecting upwardly from the stacking structure.

5. The dehumidifier system of claim 3 wherein the stacking structure includes a lock mechanism to prevent stowing of the dehumidifier housing within the condensate tank housing, wherein the docking pipe extends through the lock mechanism.

6. The dehumidifier system of claim 1 wherein the docking pipe includes an outlet end and an opposing inlet end, wherein the outlet end of the docking pipe is adjacent a top wall defining an opening of the condensate tank housing and the inlet end is adjacent a bottom wall of the condensate tank, and wherein the outlet end defines an opening facing upwardly along the vertical axis.

7. The dehumidifier system of claim 1 wherein the condensate tank includes at least one screen adjacent an inlet end of the docking pipe.

8. The dehumidifier system of claim 1 wherein the docking pipe is misaligned with the docking member when the dehumidifier housing is a first orientation about the vertical axis when in a stowed position relative to the condensate tank housing and the docking pipe is aligned with the docking member when the dehumidifier housing is in a second orientation, different from the first orientation, about the vertical axis when in a deployed position relative to the condensate tank housing.

9. A dehumidifier system comprising:

a dehumidifier having a housing, wherein the housing includes a top wall and an opposing bottom wall, and wherein the bottom wall includes a docking member;

a condensate tank having a housing defining a volume therein, wherein the housing includes a top wall defining an opening and an opposing bottom wall, and a docking pipe having an inlet end adjacent the bottom wall and an outlet end adjacent the top wall; and wherein the housing of the dehumidifier is in a telescoping engagement within the volume of the housing of the condensate tank between a stowed position and a deployed position, wherein when in the stowed position the bottom wall and the docking member of the dehumidifier housing is adjacent the bottom wall of the condensate tank housing and when in the deployed position the bottom wall and the docking member of the dehumidifier housing is adjacent the top wall of the condensate tank housing thereby positioning the docking member in an axial engagement with the outlet end of the docking pipe along a vertical axis.

10. The dehumidifier system of claim 9 wherein the docking member of the dehumidifier is in a first orientation about the vertical axis relative to the condensate tank in the stowed position and a second orientation, different than the first orientation, about the vertical axis relative to the condensate tank in the deployed position.

11. The dehumidifier system of claim 9 wherein the axial engagement between the docking member and the docking pipe occurs in a single pivot position about the vertical axis in the deployed position.

12. The dehumidifier system of claim 9 further comprising a stacking structure between the dehumidifier and the condensate tank when in the deployed position, wherein the stacking structure stops the telescoping engagement between the condensate tank and the dehumidifier, and wherein the docking pipe is positioned adjacent the stacking structure about an inner periphery of the condensate tank housing.

13. The dehumidifier system of claim 12 wherein the docking pipe includes an outlet end projecting upwardly from the stacking structure.

14. The dehumidifier system of claim 12 wherein the stacking structure includes a lock mechanism to prevent stowing of the dehumidifier housing within the condensate tank housing, wherein the docking pipe extends through the lock mechanism.

15. A method of operating a dehumidifier system comprising the steps of:

providing a dehumidifier having a housing, a pump, and a docking member upstream of the pump;

providing a condensate tank having a housing and a docking pipe; and telescoping the housing of the dehumidifier relative to the housing of the condensate tank along a vertical axis to releasably and axially engage the docking member to the docking pipe; and sealing the docking member to the docking pipe when telescoping the housing of the dehumidifier relative to the housing of the condensate tank along the vertical axis.

16. The method of claim 15 further comprising pivoting the dehumidifier housing relative to the condensate tank housing about the vertical axis between a first pivot position and a second pivot position different from the first pivot position, wherein the docking member is axially aligned with the docking pipe in the first pivot position about the vertical axis and is axially misaligned with the docking pipe in the second pivot position.

17. The method of claim 15 further comprising stacking the dehumidifier housing relative to the condensate tank housing with one or more stacking structures when releasably and axially engaging the docking member to the docking pipe.

18. The method of claim 17 further comprising pumping fluid from the condensate tank housing through the docking pipe extending through one or more stacking structures.

19. The method of claim 15 further comprising telescoping the housing of the dehumidifier relative to the housing of the condensate tank along the vertical axis to releasably and axially disengage the docking member from the docking pipe.

* * * * *